(12) United States Patent
Gentry et al.

(10) Patent No.: US 7,523,304 B2
(45) Date of Patent: Apr. 21, 2009

(54) GENERATION OF SET COVERINGS WITH FREE RIDERS, AND GENERATION OF ORDERED SETS OF MEETING POINTS, IN SYSTEMS WHICH INCLUDE, BUT ARE NOT LIMITED TO, SYSTEMS FOR BROADCAST ENCRYPTION AND SYSTEMS FOR CERTIFICATE REVOCATION

(75) Inventors: Craig B. Gentry, Mountain View, CA (US); Zulfikar Amin Ramzan, San Mateo, CA (US); David P. Woodruff, Cambridge, MA (US)

(73) Assignee: NTT DoCoMo, Inc., Tokyo (JP)

( * ) Notice: Subject to any disclaimer, the term of this patent is extended or adjusted under 35 U.S.C. 154(b) by 114 days.

(21) Appl. No.: 11/561,096

(22) Filed: Nov. 17, 2006

(65) Prior Publication Data
US 2007/0168659 A1    Jul. 19, 2007

Related U.S. Application Data

(60) Provisional application No. 60/739,657, filed on Nov. 22, 2005.

(51) Int. Cl.
*H04L 9/00* (2006.01)
(52) U.S. Cl. .................... 713/158; 713/156; 713/157; 380/278
(58) Field of Classification Search ............... 713/158
See application file for complete search history.

(56) References Cited

U.S. PATENT DOCUMENTS 7,337,315 B2 * 2/2008 Micali ................... 713/157

2002/0147906 A1 * 10/2002 Lotspiech et al. ........... 713/158

(Continued)

OTHER PUBLICATIONS

Eli et al, Efficient Methods for Integrating Traceability and Broadcast Encryption Jan. 1999.*

(Continued)

*Primary Examiner*—Nasser G Moazzami
*Assistant Examiner*—Fikremariam Yalew
(74) *Attorney, Agent, or Firm*—Haynes and Boone, LLP

(57) ABSTRACT

In a broadcast encryption scheme, an optimal or near-optimal set covering CV(f,P) is computed for a set P of privileged users and at most a predefined number f of revoked users ("free riders"). The covering consists of elements of a predefined set cover CC(U) for the set of all users U. The covering is computed by finding optimal or near-optimal coverings for privileged users for CC(U) elements that are proper subsets of U. More particularly, possible assignments of free riders to the subsets are examined, and an assignment is selected to fit an optimality criterion for the total set covering. In some embodiments, only "meeting point" elements of CC(U) are fully examined. A meeting point is an element containing at least two "immediate child" elements each of which contains a revoked user. An immediate child of a "parent" element is a proper subset of the parent with no intermediate elements (no elements containing the child as a proper subset and itself being a proper subset of the parent). An ordered list MP of meeting points is computed efficiently. The list is ordered by the number of elements in a chain from the meeting point to the root. The complete-subtree method is used in some embodiments. The methods have applications besides broadcast encryption, e.g. certificate revocation.

21 Claims, 6 Drawing Sheets

U.S. PATENT DOCUMENTS

2007/0016769 A1* 1/2007 Gentry et al. ............... 713/163

OTHER PUBLICATIONS

M. Abdalla, Y. Shavitt, and A. Wool. Key Management for Restricted Multicast Using Broadcast Encryption. In *ACM Trans. on Networking*, vol. 8, No. 4, pp. 443-454.2000.

W. Aiello, S. Lodha, and R. Ostrovsky. Fast digital identity revocation. In *In proceedings of Asiacrypt '01*, 2001.

U. Feige, *A threshold of Inn for approximating set cover*, JACM, 1998, pp. 634-652.

A. Fiat and M. Naor. *Broadcast encryption*, Crypto, 1993, pp. 480-491.

E. Gafni, J. Staddon, and Y. L. Yin. *Efficient methods for integrating traceability and broadcast encryption*, Crypto, 1999, pp. 372-387.

R. Kumar, S. Rajagopalan, and A. Sahai. *Coding constructions for blacklisting problems without computational assumptions*, Crypto, 1999, pp. 609-623.

R. Kumar and A. Russell. *A note on the set systems used for broadcast encryption*, SODA, 2003, pp. 470-471.

J. Lotspiech, D. Naor, and M. Naor. *Revocation and tracing schemes for stateless receivers*, Crypto, 2000, pp. 41-62.

M. Luby and J. Staddon. *Combinatorial Bounds for Broadcast Encryption*, Eurocrypt, 1998, pp. 512-526.

C. Lund and M. Yannakakis. *On the hardness of approximating minimization problems*, JACM, 1994, pp. 960-981.

S. Micali. Efficient Certificate Revocation. MIT/LCS/TM 542b, Massachusetts Institute of Technology, 1996.

S. Micali. NOVOMODO: scalable certificate validation and simplified PKI management. In *Proceedings of the 1st Annual PKI Research Workshop*, 2002.

T. M. Chan. All-pairs shortest paths with real weights in $O(n^3/\log n)$ time. In *Proc 9th WADS*, LNCS 3608, pp. 318-324, 2005.

Y. Han. *Deterministic sorting in $O(n \log \log n)$ time and linear space*. Journal of Algorithms, 2004, pp. 96-105.

Y. Han and M. Thorup. *Sorting in $O(n\sqrt{\log \log})$ expected time and linear space*. FOCS, 2002, pp. 135-144.

D. Naor, M. Naor and J. Lotspiech. Revocation and Tracing Schemes for Stateless Receivers. In *Proc. Of Crypto 2001*, LNCS 2139, pp. 41-62. Springer-Verlag, 2001.

Z. Ramzan and D. P. Woodruff. Fast Algorithms for the Free Riders Problems in Broadcast Encryption. In *Proc. Of Crypto 2006*.

* cited by examiner $S_i \longleftrightarrow k_{S_i}$    FIG. 3 PRIOR ART

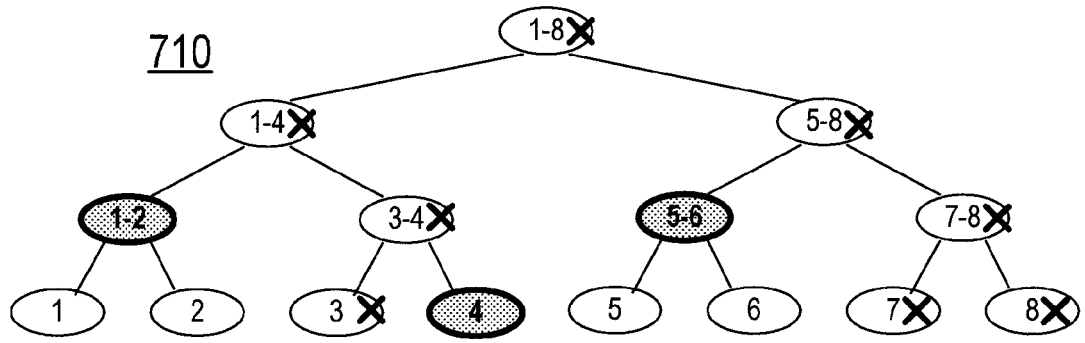
FIG. 7   PRIOR ART
1. $C(P) \leftarrow Empty$
2. For each $v$ in $R$,
   For each $x$ which is a child of $v$,
     If $x$ is not in $R$
       Add $x$ to $C(P)$
FIG. 8   PRIOR ART
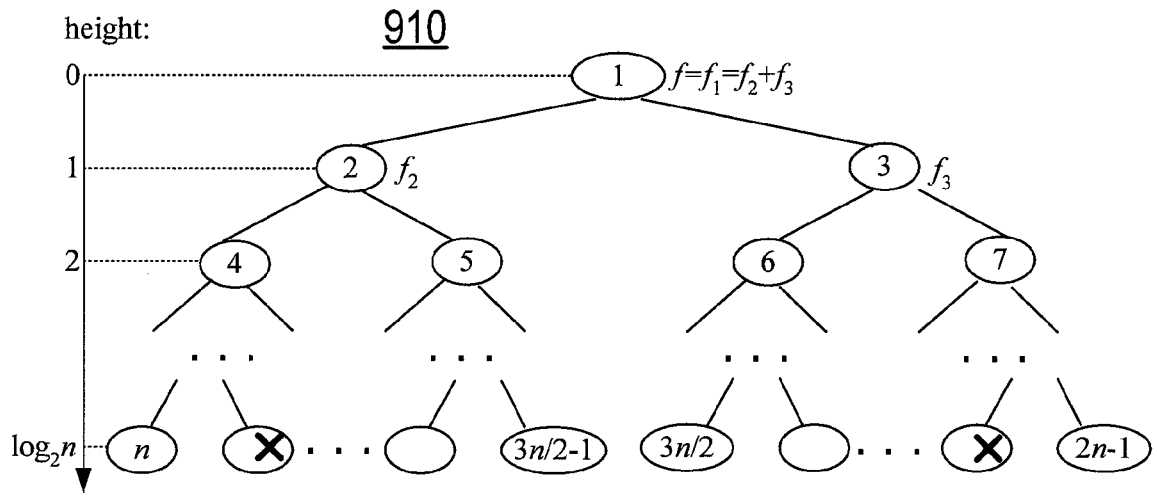
FIG. 9

$TBL1[v, f_v]$  $j=f_v$

| v | | 0 | | | 1 | | | ... | f | | |
|---|---|---|---|---|---|---|---|---|---|---|---|
| | 1 | Size | Cover | Defined? | Size | Cover | Defined? | ... | Size | Cover | Defined? |
| | 2 | Size | Cover | Defined? | Size | Cover | Defined? | ... | Size | Cover | Defined? |
| | ⋮ | | | | | | | | | | |
| | 2n-1 | Size | Cover | Defined? | Size | Cover | Defined? | ... | Size | Cover | Defined? |

FIG. 10

$TBL2[v, f_v]$  $j=f_v$

| | 0 | | | 1 | | | ... | f | | |
|---|---|---|---|---|---|---|---|---|---|---|
| 1 | Size | $f_{Lmin}$ | Defined? | Size | $f_{Lmin}$ | Defined? | ... | Size | $f_{Lmin}$ | Defined? |
| 2 | Size | $f_{Lmin}$ | Defined? | Size | $f_{Lmin}$ | Defined? | ... | Size | $f_{Lmin}$ | Defined? |
| ⋮ | | | | | | | | | | |
| 2n-1 | Size | $f_{Lmin}$ | Defined? | Size | $f_{Lmin}$ | Defined? | ... | Size | $f_{Lmin}$ | Defined? |

FIG. 11

| v | $f\!f[v]$ |
|---|---|
| 1 | $f$ |
| 2 | $TBL2[1,f].f_{Lmin}$ |
| 3 | $f - TBL2[1,f].f_{Lmin}$ |
| 4 | $TBL2[2, f\!f[2]].f_{Lmin}$ |
| 5 | $f\!f[2] - TBL2[2, f\!f[2]].f_{Lmin}$ |
| ⋮ | |
| 2n-2 | $TBL2[n-1, f\!f[n-1]].f_{Lmin}$ |
| 2n-1 | $f\!f[n-1] - TBL2[n-1, f\!f[n-1]].f_{Lmin}$ |

FIG. 12

GENERATION OF SET COVERINGS WITH FREE RIDERS, AND GENERATION OF ORDERED SETS OF MEETING POINTS, IN SYSTEMS WHICH INCLUDE, BUT ARE NOT LIMITED TO, SYSTEMS FOR BROADCAST ENCRYPTION AND SYSTEMS FOR CERTIFICATE REVOCATION

CROSS REFERENCE TO RELATED APPLICATIONS

The present application claims priority of U.S. provisional patent application No. 60/739,657, filed Nov. 22, 2005, incorporated herein by reference.

BACKGROUND OF THE INVENTION

This invention relates to data processing, and in particular to computer processing of set systems such as can be used in various applications including, for example, broadcast encryption and certificate revocation.

EXCLUSIVE SET SYSTEMS. In [8] Kumar and Russell formalized the notion of an exclusive set system, which is a family of sets for which every large subset of the universe can be written as the union of some collection of subsets from the family. More formally, Definition 1. A family of subsets $CC=\{S_1, \ldots, S_k\}$ over $[n]$ is $(n,k,r,t)$—exclusive if for any subset $R \subset [n]$ with $|R| \leq r$, we can write $[n] \backslash R = \cup_{j=1}^{t} S_{i_j}$ for some $1 \leq i_j \leq k$. (Indices $i_j$ do not have to be distinct, so R can be the union of less than t distinct sets $S_{i_j}$.) Here $[n]$ denotes the set of positive integers $\{1, \ldots, n\}$. Clearly, $[n]$ can be replaced with any set U of n entities.

The family $\{S_{j_1}, \ldots, S_{j_t}\}$ is called a cover or covering for the set $[n]\backslash R$, and is sometimes denoted $C_R$ herein. In practical applications, we can think of R as the set of "revoked" entities, and the set $P=U\backslash R$ as the set of "privileged" entities. We will sometimes refer to P as "target set". We denote $C(P)=C_R$.

In the example of FIG. 1, the elements of $[n]$ are shown as crosses in a two-dimensional plane. Each element $i \in [n]$ is marked with reference numeral 104.i. The set R consists of elements 104.1, 104.2, 104.3 ($r \geq 3$). The set $[n]\backslash R$ is covered by three sets $S_1, S_2, S_3$ ($t \geq 3$ and $k \geq 3$), where $S_1=\{4,5,6\}$, $S_2=\{6,7\}$, and $S_3=\{8\}$.

Determining the exact tradeoff between n, k, r, and t is a fundamental combinatorial problem with significant applications in computer science.

APPLICATION TO BROADCAST ENCRYPTION. In a broadcast encryption scheme, there is a server 210 (FIG. 2A) sending a broadcast to n clients 104.1-104.n. The broadcast content B is encrypted with some symmetric encryption algorithm 1 (as shown at 220) using a secret key bk. The encrypted content $E1_{bk}(B)$ is broadcast to the clients 104. Each client 104.i possesses an encryption key $k_i$ for a symmetric encryption algorithm 2. In this example, the set R of revoked clients consists of terminals $\{1, \ldots, r\}$, i.e. $\{104.1, \ldots, 104.r\}$. The server encrypts the key bk with the algorithm 2 (as shown at 230) n−r times using the respective keys $k_{r+1}, \ldots, k_n$ of the non-revoked clients. The resulting encryptions are shown as $E2_{k_{r+1}}(bk), \ldots, E2_{k_n}(bk)$. The server broadcasts these encryptions (possibly over a wireless network).

Each client 104 (FIG. 2B) receives these broadcasts. The non-revoked clients 104.r+1 ..., 104.n each execute a decryption algorithm 2 (as shown at 240) corresponding to the encryption algorithm 2. At step 240, each of these clients i (i=r+1, . . . , n) uses the corresponding key $k_i$ and the encryption $E2_{k_i}(bk)$ to recover the key bk. The key bk and the broadcast encryption $E1_{bk}(B)$ are then provided as inputs to a decryption algorithm 1 corresponding to the encryption algorithm 1, as shown at 250. The output is the broadcast content B.

The revoked clients 104.1, . . . , 104.r cannot recover the broadcast content B because they do not receive the encryptions of the broadcast key bk with the keys $k_1, \ldots, k_r$.

In this example, each broadcast includes n-r encryptions at step 230. The number of encryptions can be reduced to at most t if each set $S_i$ is associated with an encryption key $k_{S_i}$ provided to all clients 104 which are members of the set $S_i$. See FIG. 3. The server determines the set cover $\{S_{i_j}|j=1, \ldots, t\}$ for the set $[n]\backslash R$. At step 230 (FIG. 4A), the server 210 encrypts the key bk using the corresponding keys $$k_{S_{i_j}}.$$

Since only the non-revoked clients each have one or more of the keys $$k_{S_{i_j}},$$

only these clients will be able to recover the key bk at step 240 (FIG. 4B) and recover the broadcast content B. At step 240, the client can use any key $$k_{S_{i_j}}$$

for the set $S_{i_j}$ to which the client belongs. Any coalition of the revoked members (revoked clients) learns no information from the broadcast even if they collude.

Since each subset of t keys can correspond to at most one set $[n]\backslash R$, we need $$\binom{k}{t} \geq \sum_{i=0}^{r} \binom{n}{i} \geq \binom{n}{r},$$

or equivalently, $$k = \Omega\left(t \binom{n}{r}^{r/t}\right).$$

(The lower bound we use here is the same as that given by Lemma 11 in [10], and is unknown to be tight for general n, r, and t. We note that the bounds in that paper are generally not tight.) For instance, their Theorem 12 can be improved by using the sunflower lemma with relaxed disjointness (p. 82 in [6]) instead of the sunflower lemma. This general technique of using exclusive set systems for broadcast encryption in known in the art as the subset-cover framework. In particular, an exclusive set system forms a "subset cover":

Definition 2. A collection CC(U) of subsets $S_1, \ldots, S_w$ with $S_j \subseteq U$, $1 \leq j \leq w$ is called a subset cover for U if for any subset $P \subseteq U$, there exist indices $i_1, \ldots, i_m \in [1, w]$ such that:

$$P = \bigcup_{j=1}^{m} S_{i_j}$$

We call m the size of the covering.

Although problems like set-cover are NP-hard, it turns out that it is very simple to determine if a given collection of subsets forms a cover for a given target set.

Lemma A collection $S_1, \ldots, S_w$ with $S_j \subseteq U$, $1 \leq j \leq w$ forms a subset cover if and only if all the singleton sets (that is, $\{u\}$ for all $u \in U$) are included among the $S_j$.

Proof: It is easy to show the "if" direction since for any (finite) subset $P \subset U$, we have:

$$P = \bigcup_{u \in P} \{u\}$$

and the $\{u\}$ subsets are among the cover by hypothesis. For the "only if" direction, observe that if $P=\{u\}$, then the set $\{u\}$ must necessarily be part of the subset cover. Therefore, for each $u \in U$, we have that $\{u\}$ is in the subset cover.

Broadcast encryption techniques can be used for secure multicast of privileged content such as premium video, audio, and text content. One may also use broadcast encryption for content protection on external storage devices such as the hard disk of a mobile phone, USB storage devices, Flash cards, CD and DVD ROMs, etc. Other applications include Symmetric Key Infrastructures, and other situations in which a valuable content must be transmitted to multiple recipients in a secure manner.

APPLICATION TO CERTIFICATE REVOCATION. In FIG. 5, elements 104 are digital certificates used in public key infrastructures (PKI) to facilitate secure use and management of public keys in a networked computer environment. Each certificate 104 contains a user's public key PK and the user's name and may also contain the user's email address or addresses, the certificate's serial number SN (generated by a certificate authority 610 (FIG. 6A) to simplify the certificate management), the certificate issue date D1, the expiration date D2, an identification of algorithms to be used with the public and secret keys, an identification of the CA 610, validity proof data 104-V (described below) and possibly other data. The data mentioned above is shown at 104D. Certificate 104 also contains CA's signature 104-$Sig_{CA}$ on the data 104D. CA 610 sends the certificate 104 to the user's (key owner's) computer system (not shown). Either the owner or the CA 610 can distribute the certificate to other parties to inform them of the user's public key PK. Such parties can verify the CA's signature 104-$Sig_{CA}$ with the CA's public key to ascertain that the certificate's public key PK does indeed belong to the person whose name and email address are provided in the certificate.

If a certificate 104 is revoked, other parties must be prevented from using the certificate. Validity proof data 104-V is used to ascertain that the certificate is valid. In existing certificate revocation schemes known in the art, such as the one of Micali [12,13,14] and subsequently by Aiello et al., [2], in each period m (e.g. each day), certificate authority 610 issues a validation proof $c_m$ (possibly over a wireless network or some other type of network) for each non-revoked certificate in the public-key infrastructure. CA's clients 620 (FIG. 6B) provide the validation proof $c_m$ for the certificate with the certificate's validity data 104-V to a verification algorithm, as shown at 630. The verification algorithm's output indicates whether or not the certificate is valid in the period m.

In the original work of Micali, one validation proof was issued per non-revoked certificate. Thus the overall communication complexity of the system was proportional to n−r where n is the total number of users and r is the number of non-revoked certificates. Aiello et al. observed that instead of having one validity proof apply to an one individual user, one could group users together into various subsets $S_i$ as in the definition 1 or 2. In FIGS. 3 and 6A, each subset $S_i$ is associated with cryptographic information $k_{S_i}$ from which the CA can generate a validation proof $c_m(S_i)$ for the period m. This single validation proof proves the validity of all the certificates in the subset $S_i$. For each period m, the CA determines a cover $\{S_{i_j}\}$ for the set of non-revoked certificates, computes the validation proofs $c_m(S_{i_j})$, and distributes the validation proofs to the clients 620 (which may include the certificate owners and/or other parties).

Since each subset $S_i$ must be provided with a validity proof $c_m(S_i)$, the number of total validity proofs may increase, but the communication complexity for transmitting the proofs is now proportional to the t parameter in the underlying subset-cover system, and generally speaking, t<n−r, so the overall communication needed for this approach is less than that needed for the original Micali approach.

Subset covers can be constructed using trees. FIG. 7 illustrates a binary tree 710 for eight certificates, numbered 1 through 8. Each node represents a set $S_i$ in a subset cover CC(U) for the set U of the certificates. Each leaf node (labeled 1, 2, ...) represents a singleton set for a respective certificate 1, 2, ... Each higher level node represents the union of its children. E.g., node 1-4 represents the set of certificates 1 through 4. The root represents all the certificates. (We will use the numeral 710 to represent both the tree and the subset cover, i.e. the system of subsets.)

If a certificate is revoked, then the corresponding leaf is revoked, i.e. represents a set for which a validity proof must not be provided. Also, each node in the path from the leaf to the root is revoked. In the example of FIG. 7, the certificates 3, 7 and 8 are revoked (as indicated by the "x" mark). The sets 3-4, 1-4, 1-8, 7-8, 5-8 are therefore revoked. The minimal cover of the non-revoked certificates consists of nodes 1-2, 4, 5-6. Generally, the minimal cover C(P) consists of all the nodes that are immediate children of the revoked nodes. Computer algorithms for tree traversal are known that can be implemented on CA 610 to mark revoked nodes when a certificate is revoked, and to find all the immediate unrevoked children of the revoked nodes. FIG. 8 illustrates an algorithm for generating C(P) as the set of the immediate unrevoked children. C(P) is initialized to empty (step 1). At step 2, for each revoked node v, if v has unrevoked children, the children are added to C(P).

The tree method of FIG. 7 is known as a complete subtree method. Each user then stores $1+\log_2 n$ keys; these correspond to the keys associated with the vertices (i.e. nodes) on the path from the user's assigned leaf to the root of the tree. Using the complete subtree method, there is a covering of size $O(r \log(n/r))$. See [9].

FREE RIDERS. Most of the prior art on broadcast encryption assumes a stringent security requirement. In particular, any member of the privileged set P can decrypt a broadcast, but no one outside this set should be able to. For many applications this is unnecessary. In particular, the system might be able to tolerate some number of non-privileged users being able to decrypt a broadcast. Such a user is termed a free rider.

We now consider why it is desirable to permit free riders. In many situations, it is conceivable that relaxing the system to allow free riders might decrease other system costs substantially. For example, we may be able to decrease the amount of data communicated during the broadcast—if there are a large number of users to whom data is broadcast, then this might decrease the overall network traffic by a substantial amount. Consider, for example, the subset cover of FIG. 7 (which was described in the context of certificate revocation but can also be constructed for broadcast encryption). In this example, the optimal (minimal) covering C(P) of the set of privileged users consists of three nodes 1-2, 4, 5-6 as described above. If one free rider is allowed, then we could make node 3 a free rider. The minimal covering would consist then of only two nodes 1-4 and 5-6. The network traffic would be reduced.

The notion of free riders was introduced by Abdalla, Shavit, and Wool [1]. (The bracketed numbers denote references listed at the end of this disclosure before the claims.) The authors of [1] first demonstrate by example that allowing free riders can reduce the amount of data communicated (and hence the overall network traffic) in many situations. Next, they consider the question of how one might be able to arrive at the "optimal" solution that minimizes traffic for a given number of free riders. They observe that this problem is NP complete in the worst case; i.e., it is unlikely for there to be an efficient solution. They even provide theoretical evidence that the task of coming up with an algorithm that provides performance which always closely approximates the optimal solution is also challenging. Next, they suggest some "heuristic" approaches that apply to a broadcast encryption schemes in the subset-cover framework. Finally, they do experiments to analyze the performance of their heuristics on the Complete Subtree method. Their heuristics seem to perform well in these experiments, and they use these results to bolster their claims that free riders are a useful notion in the context of broadcast encryption.

More particularly, [1] defines an f-redundant cover as a cover $CC=\{S_i\}$ such that, for each set $P \subseteq U$, there is a covering $C_f(P)=\{S_{i_j}\}$ satisfying the condition:

$$\frac{\left|\bigcup_{j=1}^{m} S_{i_j}\right|}{|P|} \leq f \quad (1)$$

For a complete subtree method, their heuristic approach is as follows. The covering $C_f(P)$ is initialized to empty. The tree (such as in FIG. 7) is traversed starting at the root (node 1-8 in the example of FIG. 7) in a depth-first-search or a breadth-first-search order. Whenever a "good" set (i.e. node) v is found, add v to the cover $C_f(P)$ and ignore v's children. The set v is good if the following condition holds. Let $v_U$ denote all the users in v that are not yet covered by $C_f(P)$ (i.e. are not in any set in $C_f(P)$). Let $v_P$ denote all the privileged users (i.e. members of P) that are not yet covered by $C_f(P)$. Then v is good if $$\frac{|v_U|}{|v_P|} \leq f \quad (2)$$

[1] notes that this approach works also on non-binary trees.

This approach provides an f-redundant covering in time O(n). However, the authors of [1] do not guarantee that the covering $C_f(P)$ is minimal.

SUMMARY

This section summarizes some features of the invention. Other features are described in subsequent sections. The invention is defined by the appended claims, which are incorporated into this section by reference.

In some embodiments of the present invention, an algorithm is provided that computes minimal or near minimal coverings, thus ensuring optimal or near-optimal network traffic. The algorithm is efficient in some embodiments. Our results do not contradict those of Abdalla et al. [1]. In particular, the theory of NP-completeness only makes claims about worst-case scenarios—however, for broadcast encryption, we are interested in what happens for a specific broadcast encryption scheme. For some specific schemes we may be able to efficiently come up with the optimal solution, as we will demonstrate. In some embodiments, our approach works on the Complete-Subtree method. In some embodiments, our method is a (1+ε) approximation algorithm, where $\epsilon \geq 0$. In this setting, when ε=0, we have an algorithm that always produces a minimal covering. As ε increases, the covering may no longer be optimal, but there may be an opportunity to compute it faster.

In some embodiments, an optimal or near-optimal set-covering CV(f,P) is computed for a set P of privileged users and at most a predefined number f of revoked users. The covering consists of elements of a predefined set cover CC(U) for the set of all users U. The covering is computed by finding optimal or near-optimal coverings for elements of CC(U) that are proper subsets of U. In some embodiments, possible assignments of free riders to the elements of CC(U) are examined, and an assignment is selected to satisfy some predefined optimality criterion for the total set covering. In some embodiments, only "meeting point" elements are used. A meeting point is an element containing at least two "immediate child" elements each of which contains a revoked user. An immediate child of a "parent" element is a proper subset of the parent element with no intermediate elements (no elements containing the child as a proper subset and being itself a proper subset of the parent). An ordered list MP of meeting points is computed. The list is ordered by the number of elements in a chain from the meeting point to the root. The complete-subtree method is used in some embodiments.

In another aspect of the present invention, a method for computing the Meeting Points in a tree is provided. This method is used for a free riders method or in some other applications.

This summary is not limiting. Other embodiments and variations are within the scope of the invention, as defined by the appended claims.

BRIEF DESCRIPTION OF THE DRAWINGS

FIG. 3 illustrates a decryption key assigned to a set of clients.

FIG. 7 illustrates a prior art data structure for a complete-subtree method.

FIG. 8 illustrates pseudocode for a prior art complete-subtree method.

FIGS. 9-18 illustrate computer data structures used in some embodiments of the present invention.

DESCRIPTION OF SOME EMBODIMENTS

Figure 1:
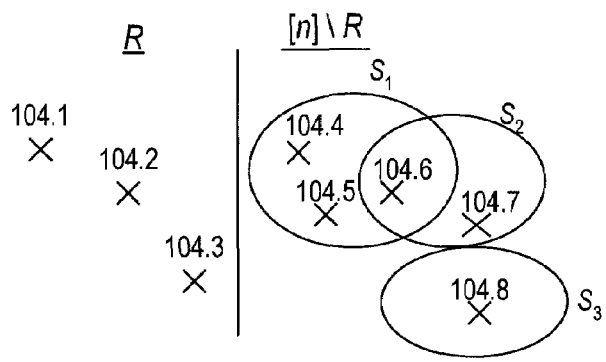
FIG. 1 illustrates a prior art subset cover.
Figure 2A:
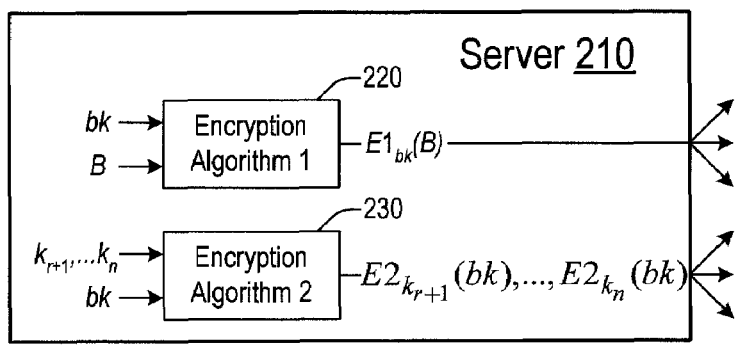
FIG. 2A illustrates a prior art server performing a broadcast encrypted for each non-revoked client.
Figure 2B:
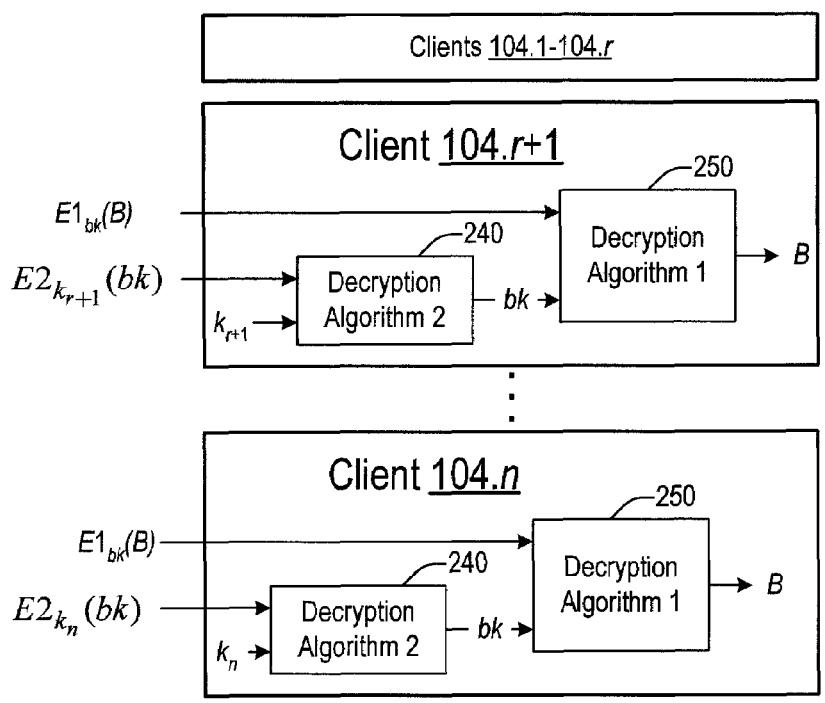
FIG. 2B illustrates prior art clients receiving a broadcast performed as in FIG. 2A.
Figure 4A:
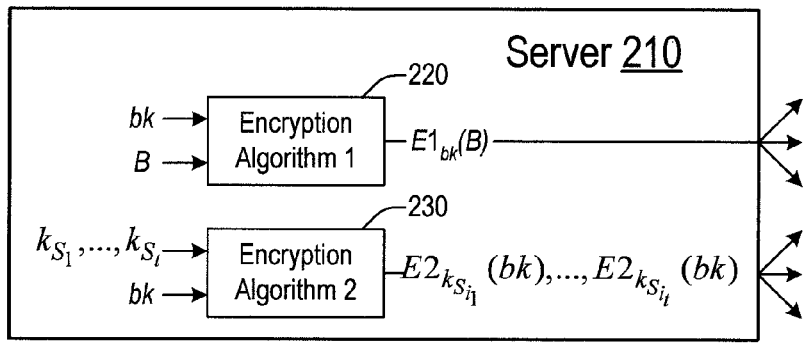
FIG. 4A illustrates a prior art server performing a broadcast encrypted once for each of sets of non-revoked client.
Figure 4B:
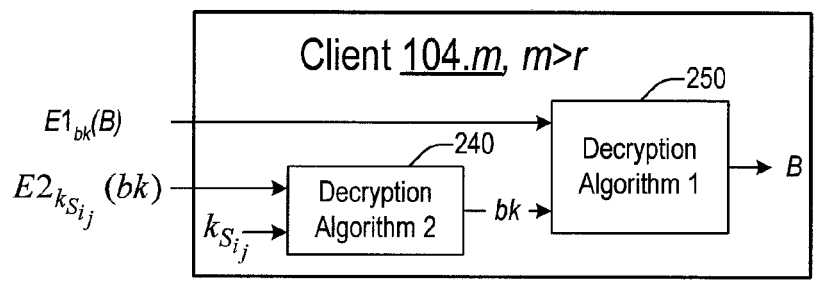
FIG. 4B illustrates prior art clients receiving a broadcast performed as in FIG. 4A.
Figure 5:
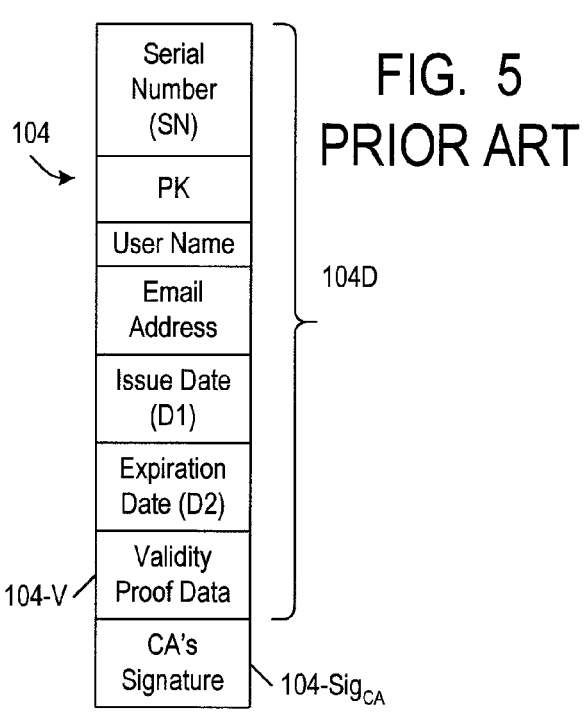
FIG. 5 illustrates a prior art digital certificate.
Figure 6A:
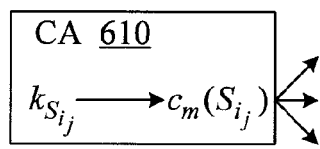
FIG. 6A illustrates a prior art certificate authority (CA) transmitting proofs of certificate validity.
Figure 6B:
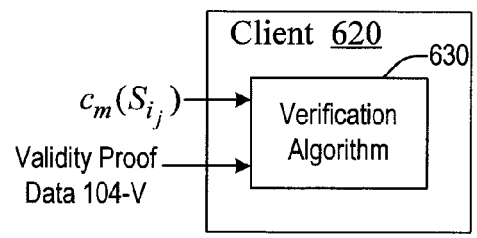
FIG. 6B illustrates a prior art client verifying a proof of certificate validity.

This section describes some embodiments of the invention. The invention is not limited to such embodiments. In particular, the invention is not limited to particular data structures, algorithms, or complexity bounds. The invention is defined by the appended claims.

Some embodiments of the invention will now be described with reference to broadcast encryption schemes. These techniques can also be used for other applications, e.g. multi-certificate validation as discussed above with respect to FIG. 7. Here the free riders are those clients whose certificate has been revoked, but who are still not recognized as such—that is, they are permitted to operate as though they have a valid certificate.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is a method for doing something. The method may require physical manipulations of physical quantities.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing computer instructions. Such a computer program can be transmitted over a network.

The present invention is not described with reference to any particular programming language. It will be appreciated that a variety of programming languages may be used to implement the teachings of the invention as described herein. Computer programs can be stored on a computer-readable medium. A computer-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

COMPUTATIONAL ASSUMPTIONS. It is known to one of ordinary skill in the cryptographic arts that the security of many cryptographic inventions relies upon making certain computational intractability assumptions; for example, one may try to prove that a cryptosystem is secure so long as it is difficult to decompose a specific number into its prime factors efficiently. The term "computational" is often used in the art to identify this class of cryptographic inventions. The present invention provides a computational scheme for password authenticated key exchange. The term "information theoretic" or "unconditional" is often used in the art in conjunction with schemes that are mathematically seen to meet a specific meaningful security definition without making any type of assumption.

While it is generally preferable from a pure security perspective not to have any computational assumptions whatsoever, there are instances of problems that cannot be solved without making such an assumption (the present invention serves as such an example). Further, it is generally known by those skilled in the art that cryptographic methods can sometimes be made more efficient by incorporating computational assumptions.

It also worth noting that often times one assumption implies another. That is, if one of the assumptions were actually true, then another assumption would be seen to be true by a mathematically logical argument. Typically the means used by those skilled in the art to show such an implication, is a transformation (often known in the art as a reduction) that converts a mechanism for violating the second assumption to a mechanism for violating the first assumption. In such cases, the first assumption is called "stronger" or the second "weaker." In general, weaker assumptions are preferable.

The issue of computational versus information-theoretic is orthogonal to the methods and apparatus of the present invention. More specifically, the applications of exclusive-set systems can be practiced using either computational or information-theoretic cryptographic mechanisms.

The issue of computational versus information-theoretic, while relevant to many cryptographic inventions, is orthogonal to the methods and apparatus of the present invention. The techniques of the present invention are applied on top of existing broadcast encryption or certificate revocation schemes—while these underlying broadcast encryption and certificate revocation schemes may base security on certain assumptions, the inventions in the present disclosure do not add any additional assumptions.

Use of Mathematical Proofs When Describing Methods. The methods disclosed herein have their basis in fundamental mathematical concepts. The description of the methods herein prescribes that certain algorithmic steps be executed.

However, the key questions of whether the steps can indeed be executed and whether executing them leads to a desired result (in this case free rider construct with desired approximation bounds) must be addressed by means of a formal mathematical argument. Familiarity with these arguments is not necessary for implementing or practicing the methods disclosed herein. Such arguments merely enable one skilled in the art to determine that the procedures are indeed correct and lead to the desired outcome. Therefore, for completeness, we have included, where appropriate, these arguments in the present disclosure. However the arguments about the correctness, feasibility, and performance of the schemes themselves should be decoupled from the actual methods and apparatus provided in this disclosure.

In the foregoing, we treat the number of users n as a power of 2. One of ordinary skill in the art will see that one can easily extend our methods to the case of an arbitrary number of users—for example, by letting n be the smallest power of two that is bigger than the number of users; this increases complexity by a factor of at most 2. We use log( ) to denote the base-2 logarithm.

For a vertex v in a tree, let T(v) be the subtree rooted at v, let LV(v) and RV(v) be the left and right children of v respectively, and let L(v) and R(v) denote the subtrees rooted at the left and right child of v, respectively. We use a standard identification of nodes of a complete binary tree 910 (FIG. 9). Namely, we label the root as 1. The root's left child is labeled 2, and the right child is labeled 3. Generally, if a node is labeled with an integer i, then its left) child is $2i$ and its right child is $2i+1$. The tree of FIG. 9 has n leafs, labeled n through $2n-1$. We define the height of a node v to be its level in the binary tree, that is $\lfloor \log_2 v \rfloor$. For nodes u, v, we define a(u, v) to be the common ancestor of u and v of largest height. For example, in FIG. 9, $a(4,5)=2$, and $a(5,6)=1$. We say that node u is to the left of node v if $u \in L(a(u,v))$ while $v \in R(a(u, v))$.

When analyzing the time complexity of our methods, we assume we work in the RAM model and that arithmetic operations can be done in O(1) time on words of size O(log n). The invention can be practiced in any model of computation, so long as the appropriate algorithmic steps can be carried out. The running time may differ in different computation models.

Let U denote the set of all users, n is the total number of users (i.e. $|U|=n$), P is the set of privileged users, R is the revoked set at a given time, and $r=|R|$.

The goal of a broadcast encryption scheme is to transmit an encrypted message M to all users U, such that the members of P can decrypt the message, but the members of R cannot. In some embodiments, even a coalition of users in R who pool together their knowledge cannot determine M. To achieve this aim, the system comprises a set of cryptographic keys $K_U$. Each user u will possess knowledge of a subset $K_u$ of these keys. The user u stores these keys on some type of receiving device (e.g., his cell phone, his DVD player, or his set-top box). Some embodiments focus on the stateless case wherein the receiver keys $K_U$ are static. That is, they are assigned during some initialization phase and remain unchanged.

Definition 3 Suppose the collection of sets $S_1, \ldots S_w$ form a subset cover CC(U) for a set U. Let P be a subset of U. Let $i_1, \ldots, i_m \in [1,w]$ such that:

$$P = \bigcup_{j=1}^{m} S_{i_j} \quad (3)$$

Given a non-negative integer f we call $\{S_{i_j}\}$ an f+-redundant cover of P if:

$$\left| \bigcup_{j=1}^{m} S_{i_j} \right| \leq f + |P|. \quad (4)$$

We denote $\{S_{i_j}\}=CV(f,P)$. We call m the size of the f+-redundant cover.

One remark is in place. Our definition of redundant covers has a superficial difference from the one given in the ASW paper (see (1) above). The choice of what definition to use is immaterial—we can recast all of the results in this disclosure using the ASW definition without any change in performance. Our definition just happens to be more convenient for describing our results. Denoting the ASW f parameter as f', an f'-redundant cover is an f+-redundant, and vice versa, if $f=|P| \cdot (f'-1)$ or, equivalently, $f'=1+f/|P|$.

Now, the goal is to minimize the size m of the redundant cover for a given number of free riders f Also, in general we would like m to be relatively small even in the worst case (regardless of the choice of the privileged set P). Some embodiments of the invention include efficient algorithms for computing the optimal or near-optimal f+-redundant cover for the Complete Subtree Method.

In some embodiments, the basic idea is to employ a dynamic program. Suppose that one had an optimal f+-redundant cover obtained using the Complete Subtree Method. For each node v of the complete binary tree 910 (such as that of FIG. 9), we let $f_v$ denote some maximum allowable number of free riders in the tree T(v). The actual number of free riders in the optimal cover can be less than the maximum f because additional free riders can increase the cover size. For example, if the optimal cover size is 0 (i.e. all the users are revoked), turning a user into a free rider would require a positive cover size to cover the free rider. Here we assume that we have an optimal cover, and assign the allowable numbers $f_v$ so that for each internal node v, $f_v$ equal the sum of the allowable numbers for the children. Thus, for the root, $f=f_1=f_1+f_2$.

If the optimal covering does not consist of the root (i.e. of the set U), then this covering includes a covering for T(2), i.e. for the first n/2 users, including up to $f_2$ free riders, and a covering for T(3) with up to $f_3$ free riders. These two coverings have to be optimal, i.e. the covering induced by the left subtree is an optimal $f_2$+-redundant covering, and the covering induced by the right subtree is an optimal $f_3$+-redundant covering. This allows us to construct the optimal cover CV(f, P) from the covers for the subtrees T(2) and T(3). Roughly, we determine the optimal coverings for all possible $f_2$ values between 0 and $f_1$ for T(2) and do the same for possible $f_3$ values for T(3). We then choose the pair of values $(f_2, f_3)$, where $f_2+f_3=f_1$ that minimizes the covering on the entire tree. The same approach can be used to find optimal coverings for T(2) and T(3). (If the optimal covering for the tree consists of the root, we treat it as a special case, which is easy to detect as $f \geq r$.)

Now we describe one embodiment in more detail. Let v be a vertex in the complete binary tree 910 (such as in FIG. 9), and U(v) denote the set of all users in the subtree rooted at v. Observe that for any vertex v in the tree, the set U(v) is one of the sets that can be employed in a covering per the complete subtree method. We let $r_v$ denote the number of revoked users in the tree T(v), i.e. $r_v = |U(v) \cap R|$. We let P(v) denote the subset of privileged users in the tree T(v). That is, $P(v)=P \cap U(v)$.

Now, let $T(v, f, P(v), U(v)).size$ denote the size of the optimal f+-redundant covering $CV(f,P(v))$ of the set $P(v)$ of the users in the subtree rooted at v. Similarly, let $T(v, f, P(v), U(v)).cover$ denote the collection of covering sets in the optimal f+-redundant covering of the set $P(v)$ of the users in the subtree rooted at v. We will sometimes omit the arguments $P(v)$ and $U(v)$, writing $T(v,f)$ instead of $(T(v,f,P(v), U(v))$.

Appendices 1 and 2 below (before the claims) illustrate one embodiment of our method. At step 1 in Appendix 1, an initialization is performed (this step is not shown in some other algorithms described below). At step 2, a method OptimalCover is called to find the optimal cover for the root node 1 with at most f free riders. At step 3, the optimal cover is used to perform suitable network transmissions or other suitable processing (for example, the processing described above in connection with FIGS. 2A-6B). Step 3 is not shown in some other algorithms described below.

The OptimalCover method is shown in Appendix 2. The input to this method is a node v and the maximum number of allowable free riders $f_v$. We note that there are three simple (overlapping) border cases; these constitute the base cases in the recursion, illustrated at steps 1 and 2 in Appendix 2. First, if f=0 (step 1), then there are no free-riders. In this case, we can employ the standard algorithm given by Naor et al. [20] for covering the associated subtree. See FIG. 8 for example. We denote this collection of sets as $BasicCover(v,P(v), U(v))$, or just $BasicCover(v)$.

Second, if $P(v)$ is empty, i.e. all the users in $U(v)$ are revoked, then the optimal covering is empty. If we assigned free riders to $U(v)$, then the covering size would increase to cover the free riders. In this case, the optimal covering can be computed as in the first case because $BasicCover(v)$ will produce an empty covering. The covering size is 0.

For the third border case (step 2), we observe that if $r_v \leq f_v$ (and $P(v)$ is not empty), then the number of free riders we can tolerate equals or exceeds that of the number of revoked users in the subtree. In this case, we can achieve an optimal covering of size 1 by simply allowing all the non-privileged users to be free riders. That is, $T(v, f, P(v), U(v)).size=1$ and $T(v, f, P(v), U(v)).cover=U(v)$ (we use v and $U(v)$ interchangeably sometimes).

Note that if v a leaf of the tree, then one of these three border cases will apply. In particular, when $f_v=0$ or the leaf is revoked, the first or second case will apply. If $f_v>0$, and the leaf is not revoked, then $r_v=1$ and hence $f_v \geq r_v$. Therefore, the third case applies.

Step 3 of Appendix 2 is the general inductive case for an internal vertex v for $f_v>0$. Denoting $f_L=f_{LV(v)}$, $$T(v, f_v) \cdot size = \min_{0 \leq f_L \leq f_v} T(LV(v), f_L) \cdot size + T(RV(v), f_v - f_L) \cdot size \quad (5)$$

For a value $f_L=f_{Lmin}$ that minimizes (5), we have:

$$T(v,f_v).cover = T(LV(v),f_{Lmin}).cover \cup T(RV(v),f_v-f_{Lmin}).cover \quad (6)$$

(There may be multiple $f_L$ values that minimize (5), and $f_{Lmin}$ can be any of these values.)

Evaluation of Efficiency. In some embodiments, the values $T(v,f_v)$ are stored in an $(2n-1) \times (f+1)$ table TBL1 (FIG. 10). Each row of the table is associated to a vertex v. Note that if we have n users (at the leaves of the tree), then the tree contains 2n-1 vertices total. Each column of the table specifies a bound $j=f_v$ on the number of free riders (between 0 and f). Each entry in the table specifies a record that contains three fields. The first field ("Size") specifies the optimal cover size $T(v,f_v).size$. The second field ("Cover") specifies actual optimal covering $T(v,f_v).cover$. The third field ("Defined?") is a Boolean specifying whether the first two fields have been defined yet by the algorithm. "Defined?" is initialized to FALSE. Initializing the entire table to make all these records false takes $O((2n-1) \times (f+1))=O(nf)$ work. Once a record contains information about the cover size and actual covering, the "Defined?" is set to TRUE.

To access the elements of the table, a tree data structure (not shown) is used in some embodiments to represent the complete binary tree 910 (like in FIG. 9). Each node in the tree data structure contains an array of size f+1. Each array element [j] for a node v contains a pointer to the entry TBL1 [v,j] in the table of FIG. 10. This would allow us to efficiently traverse the table elements in accordance with the recurrence relations specified above in Appendix 2. Note that we can always simply have the tree itself contain the records in the table; i.e., there is no reason to have a separate table. We give the table description since it's easier to think of a dynamic program as implemented using a table.

Next, some embodiments initialize the first column (i.e., $f_v=0$) at step 1 of Appendix 1. This could be done by using the standard scheme ([20] or FIG. 8) to compute $BasicCover(v, P(v),U(v))$ separately for each v. This requires work on the order of:

$$n+2(n/2)+2^2(n/2^2)+ \ldots +2^{log\ n}(n/(2^{log\ n}))=n \log n.$$

We can actually do better by recycling the work done on the subtrees. Observe that for an interior vertex v, once we compute the values $BasicCover(L(v),P(L(v)),U(L(v)))$ and $BasicCover(R(v),P(R(v)),U(R(v)))$, then we can compute $BasicCover(v,P(v),U(v))$ in constant time. In particular, if
$BasicCover(L(v),P(L(v)),U(L(v)))=U(L(v))$ and
$BasicCover(R(v),P(R(v)),U(R(v)))=U(R(v))$, then $BasicCover(v, P(v),U(v))=U(v)$. Otherwise,
$BasicCover(v,P(v),U(v))=$
$BasicCover(L(v),P(L(v)),U(L(v))) \cup BasicCover(R(v),P(R(v)),U(R(v)))$.

At the leaves we only require O(1) time to compute the optimal basic cover (i.e., for a leaf v, the cover is $U(v)$ is $v \in P$ otherwise the cover is empty). Using the above recurrence, we only require O(1) time for the interior vertices. Therefore, we can initialize the first column in O(n) time.

Now, let's consider the main body of the algorithm. At each point in the recursion, the most time-consuming part is in the computation of equation (5) hereinabove (step 3 in Appendix 2). This requires $O(f_v)$ work (where $f_v$ is the column number). We have to repeat this for each entry in the table. So, the overall running time for the main body is:

$$O\left(\sum_{j=1}^{f}(2n-1) \cdot j\right) = O(nf^2).$$

This would make the running time of the entire algorithm $$O(nf)+O(n)+O(nf^2)=O(nf^2).$$

One possible quibble is that technically speaking the inputs to the algorithm are a description of the users, the privileged set, and collection of sets associated with the complete subtree method (which requires at least $\Omega(n)$ bits) and a description of f (which requires log f bits); this means that the running time is technically exponential in the size of f. However, this is actually a mirage. The number of free riders f is at most the number of users n. Therefore, the size of f is at most log n. This means the input size is at least $\Omega(n)$ bits, and the running time is at most $O(n^3)$.

One can do a tighter analysis. Observe that for each node at the $l^{th}$ level (where the root is at the $0^{th}$ level) when computing the minimum (5), one can get away with $O(\min\{f, n/2^l\})$ work. This is because at the $l^{th}$ level, there are $n/2^l$ leaves in each subtree. There is no reason to consider what happens when the number of free riders exceeds the number of leaves. Therefore, we can charge each vertex v at level l, with a cost of $O(n/2^l)$. Furthermore, there are $2^l$ vertices at level l. The running time for the most time-consuming step then becomes:

$$\sum_{l=1}^{1+\log n} (2^l \cdot O(n/2^l)) = O(n \log n).$$

We have to repeat this for all possible values of $f_v$ (since all these values will be needed when combining the optimal solutions for each subtree). This gives a run time of $O(nf \log n)$. Also, there is no need to maintain f+1 records for each vertex. Instead, we can maintain $n/2^l$ entries for each vertex at level l. Initializing the records will require $O(n \log n)$ time. The overall worst-case running time of the algorithm under this analysis is then $O(nf \log n))$. This gives a better bound than what we have previously whenever $f \geq \log n$. This is likely to be the case for any practical setting of the parameters. For example if n is a billion, then f would have to be more than 30 for the other bound to be more accurate.

In some embodiments, the OptimalCover method does not compute the optimal cover itself but only computes the $f_{Lmin}$ values. See Appendix 3, showing the method OptimalCover-Size. FIG. 11 shows a suitable data structure TBL2 used instead of TBL1 for some embodiments of Appendix 3. Instead of the Size parameter, the data structure stores the $f_{Lmin}$ value such as computed at step 3 of OptimalCover. When the $f_{Lmin}$ values have been computed, the free rider leafs are determined by the method of Appendix 4 (the set of free riders is denoted as F in Appendix 4), and BasicCover is invoked to obtain the covering with the free rider leafs treated as privileged nodes (step 5 of Appendix 4).

More particularly, in Appendix 3, for each node v, the corresponding Define parameter is set to TRUE (step 1 of Appendix 3). Steps 2-4 of Appendix 3 are similar to the respective steps 1-3 in Appendix 2. The $f_{Lmin}$ values are stored in TBL2 at step (4b2) of Appendix 3.

Figure 13:
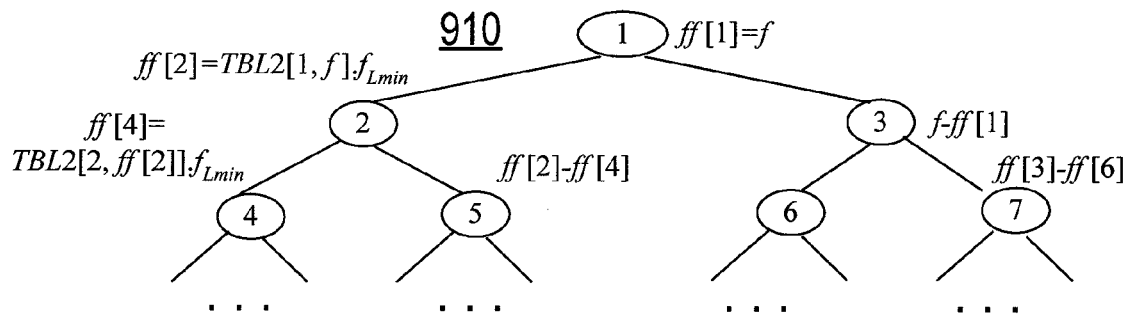

The optimal cover is computed in the method FreeRiders of Appendix 4. At step 1, the set F of the free rider leafs is initialized to an empty set (it can also be initialized to a non-empty set of users who are to receive the broadcast due to some pre-established criteria). At step 2, OptimalCoverSize (Appendix 3) is invoked for node 1 with $f_v$=f Then an array ff[v] of the optimal assignments of free riders is computed, as shown in FIG. 12 (the array values in table form for each v) and FIG. 13 (the array values next to respective tree nodes). ff[v] is an upper bound on the number of free riders assigned to v, as found in Appendix 3. ff[1] is set to f(step 3). The basic idea is that for every other node v, we examine the TBL2's $f_{Lmin}$ value corresponding to the optimal assignment ff for v's parent node. If v is a left child, then it is assigned $f_{Lmin}$ free riders, i.e. ff[v] is set to the $f_{Lmin}$ value for the parent. If v is a right child, then it is assigned the difference between the ff value for the parent and the $f_{Lmin}$ value. There special cases however, as shown at step 4 of Appendix 4.

At step 4, the tree is traversed top to bottom (e.g. in the Breadth First Search or Depth First Search order). At step (4a), if ff[v]=0, the tree T(v) has no free riders and hence can be skipped. If P(v) is empty, then the tree T(v) can also be skipped because no free riders were assigned to it (see step 2 of Appendix 3). The condition that P(v) is empty can be replaced with TBL2[v, ff[v]].Size=0. Indeed, if the optimal cover size is zero, there are no nodes to cover after the free rider assignments, so no free riders were assigned. At step (4b), if ff[v]$\geq r_v$ then the optimal f+-redundant cover CV(ff [v],U(v)) consists of node v. Hence, all the revoked nodes in T(v) are added to F, and T(v) is skipped in further traversal.

If v is a leaf, it will be processed in steps (4a) or (4b). Step (4c) thus handles only internal nodes. At this step, the ff values are computed for the children L V(v), RV(v) as discussed above ($f_{Lmin}$ for the left child and (ff[V]-$f_{Lmin}$) for the right child).

At step 5, BasicCover(1,P∩F,U) is invoked to compute the optimal covering and its size.

The invention is not limited to the particular implementations of Appendices 1-4. For example, recursion can be avoided in Appendices 2 and 3 if the respective trees are traversed down to top to compute the pertinent values in respective tables TBL1, TBL2.

Some embodiments allow larger than minimal coverings in exchange for reduced computation complexity. Let us denote the minimum covering size as $s_{min}$. For some number $\epsilon \geq 0$, we may be able to find a covering of size $s_\epsilon$ such that:

$$s_\epsilon \leq (1+\epsilon)s_{min} \qquad (7)$$

In some embodiments, if $\epsilon > 0$, such a covering reduces the amount of computation needed at step 3 of Appendix 2 or step 4 of Appendix 3, as explained in the discussion of the MinSum problem immediately below.

MinSum Problem

The minimum value in equation (5) hereinabove can be found using well known MinSum algorithms. Indeed, for a fixed node v, let us denote $$a_i = T(LV(v),i).\text{size}, \quad b_i = T(LV(v),i).\text{size} \qquad (8)$$

Then the minimum in (5) can be written as $$\min_{0 \leq j \leq i} (a_j + b_{i-j}) \qquad (9)$$

where $j=f_L$ and $i=f_v$. Finding such minima is the well-known MinSum problem when each of $\{a_i\}$ and $\{b_i\}$ is a decreasing (i.e. non-increasing) sequence in i. In our case, for any node v, the value $T(v,f_v)$.size is a decreasing function of $f_v$ (not necessarily strictly decreasing, i.e. the function is non-increasing). Indeed, $f_v$ is an upper bound on the allowable number of free riders, and the minimum cover size decreases (non-strictly) as the upper bound is relaxed.

Let $\epsilon \geq 0$, and let $a_{m_1} \geq a_{m_1-1} \geq \ldots \geq a_1 \geq 0$ and $b_{m_2} \geq b_{m_2-1} \geq \ldots \geq b_1 \geq 0$ be integer sequences such that for all i, $|a_i - a_{i-1}|$ and $|b_i - b_{i-1}|$ are bounded by some predefine bound A. It should be clear to one of ordinary skill in the art that there exists an algorithm MinSum$((a_i), (b_i), \epsilon)$ that outputs an array c such that for all $2 \leq i \leq m_1 + m_2$, it holds that $$a_{c[i]} + b_{i-c[i]} \leq (1+\epsilon)\min_j(a_j + b_{i-j}).\text{tm} \quad (10)$$

If $a_i$ and $b_i$ are as in (8), then c[i]=$f_{Lmin}$ ($i=f_v$, and clearly $f_{Lmin}$ depends on $f_v$). The time complexity of the c[i] computation is an increasing function of the bound A.

Theorem. If $\epsilon \geq 0$, then the time complexity of MinSum is $$O\left(\frac{m_1 m_2}{\log(m_1 + m_2)}\right).$$

Proof: The algorithm for this case is already known in the art, and can be found in [16]. It is essentially a direct application of a technique given in [15]. For completeness, we describe the algorithm here. (We remark that our invention can be practiced using any alternate MinSum algorithm, not necessarily the one described below or satisfying the time complexity bound given in this theorem.)

The algorithm uses a subroutine for finding all dominating pairs between a red point set and a blue point set in d-dimensional space. We say that a red point $p=(p_1, \ldots, p_d)$ and a blue point $q=(q_1, \ldots, q_d)$ form a dominating pair if, and only if, $p_i < q_i$ for all $i \in [d]$. Here [d] denotes the set of all integers from 1 to d inclusive. The following is Lemma 2.1 of [15].

Lemma 4 Given n red/blue d-dimensional points, we can report all K dominating pairs in $$O(c_\epsilon^d n^{1+\varepsilon} + K)$$

time for any constant $\epsilon \in (0, 1)$, where $$c_\epsilon = 2^\epsilon/(2^\epsilon - 1).$$

The application of this lemma to MinSum is pointed out in [16]. Let $d = \delta \log(m_1 + m_2)$ for a sufficiently small constant $\delta$. The idea is to define two point sets $\{p_i\}$ and $\{q_j\}$:

$$\{p_i = (a_{i-ai-d}, a_i - a_{i-d+1}, \ldots, a_i - a_{i+d}) | \text{ all } i\}$$

$$\{q_j = (b_{j+d} - b_j, b_{j+d-1} - b_j, \ldots, b_{j-d} - b_j) | \text{ all } j\}$$

Then we compute all the dominating pairs between these sets. Because $a_i + b_{k-i} < a_{i'} + b_{k-i'}$ if, and only if, $a_i - a_{i'} < b_{k-i'} - b_{k-i}$, if we have a dominating pair of the form $(p_i, q_{k-i})$, then $a_i + b_{k-i} = \min_{i'=d, \ldots, i+d}(a_{i'} + b_{k-i'})$. By standard perturbation techniques, we can guarantee that $a_{i'} + b_{k-i'} \neq a_{i''} + b_{k-i''}$ for any $i' \neq i''$. It follows that there can be at most $O((m_1 + m_2) \min(m_1, m_2)/d) = O(m_1 m_2/d)$ dominating pairs, and thus, using Lemma 4, they can all be found in $O(m_1 m_2 / \log(m_1 + m_2))$ time, provided $\delta$ is a small enough constant. Finally, MinSum can output each entry of its array c by taking a minimum over just $O(\min(m_1, m_2)/d)$ terms, i.e., those provided by the dominating pairs. So the total time is $O(m_1 m_2 / \log(m_1 + m_2))$, as desired.

Figure 14:
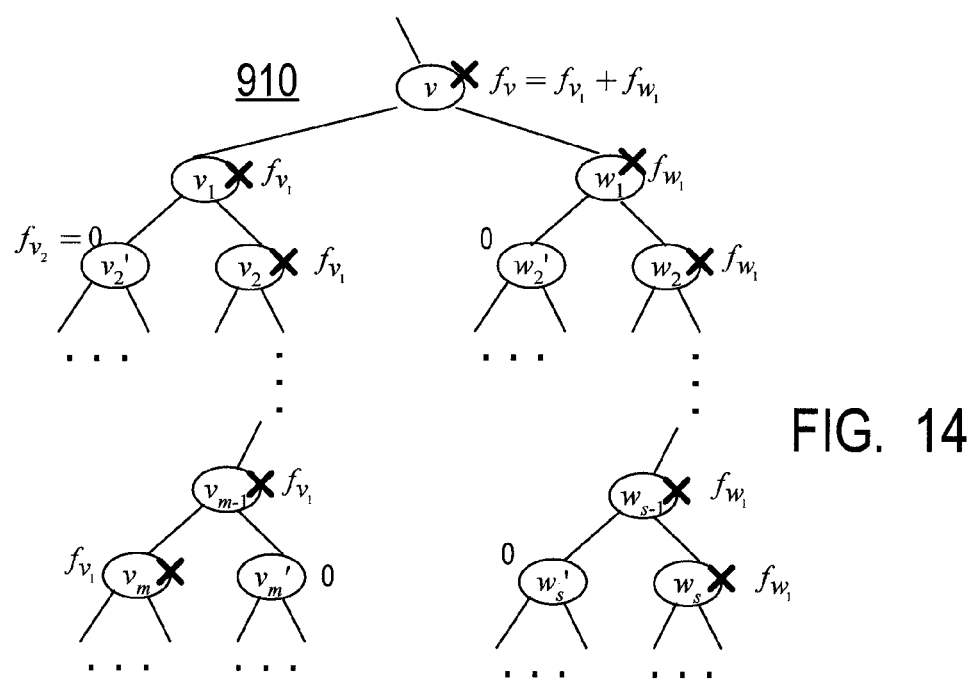

Meeting points. Turning back to the methods of Appendices 2 and 3, further optimization can be achieved as follows. FIG. 14 shows a portion of a complete binary tree 910. A vertex v has revoked children $v_1, w_1$. Consecutive vertices $v_1, v_2, \ldots, v_m$ are on a path to a revoked leaf ($v_m$ may or may not be a leaf). Vertices $v_2', \ldots, v_m'$ are the siblings of the respective vertices $v_2, \ldots, v_m$. The siblings are not revoked.

Suppose now an optimal free rider assignment assigns some maximum allowable number $f_{v_1}$ of free riders to the node $v_1$. Since $v_2'$ is unrevoked, all the free riders for $v_1$ should be assigned to $v_2$ in an optimal assignment, i.e. we should set $f_{v_2} = f_{v_1}$ and $f_{v_2'} = 0$. This corresponds to the value $f_{Lmin} = 0$ at step (3a) in Appendix 2 when executing OptimalCover($v_1, f_{v_1}$). Therefore, we can avoid solving the general minimization problem (MinSum) at step (3a). (Also, at step (3b), we can set TL.size=1, TL.cover=$v_2'$.) If node $v_2$ were a left child, we would set $f_{Lmin} = f_{v_1}$.

In fact, the value $f_{v_1}$ should be assigned to all the nodes in the sequence $v_2, \ldots, v_m$. The optimal cover for node v, can be computed directly from the optimal cover for the node $v_m$ by adding the sets $v_2', \ldots, v_m'$ to the optimal cover for the node $v_m$.

Likewise, consecutive vertices $w_1, w_2, \ldots, w_s$ are on a path from $w_1$ to a revoked leaf ($w_s$ may or may not be a leaf). The siblings $w_2', \ldots, w_s'$ of vertices $w_2, \ldots, w_s$ are unrevoked. The upper bound $f_{w_1}$ for the number of free riders for the node $w_1$ should be assigned to all the nodes $w_2, \ldots, w_s$ in an optimal assignment. The optimal cover for node $w_1$ can be computed directly from the optimal cover for the node $w_s$.

We will call the node v a "meeting point" (a point of meeting of the paths from revoked nodes $v_m, w_s$ to the root). More generally, a meeting point is an internal node whose two immediate children are revoked. In addition, revoked leafs will also be called meeting points.

Figure 15:
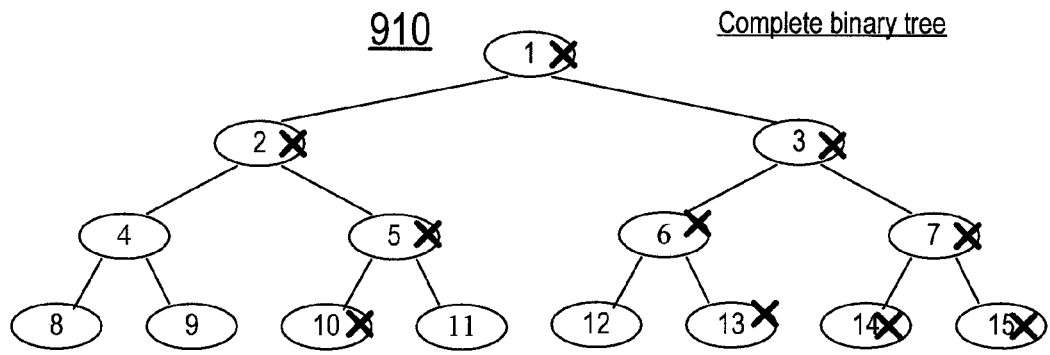
Figure 16:
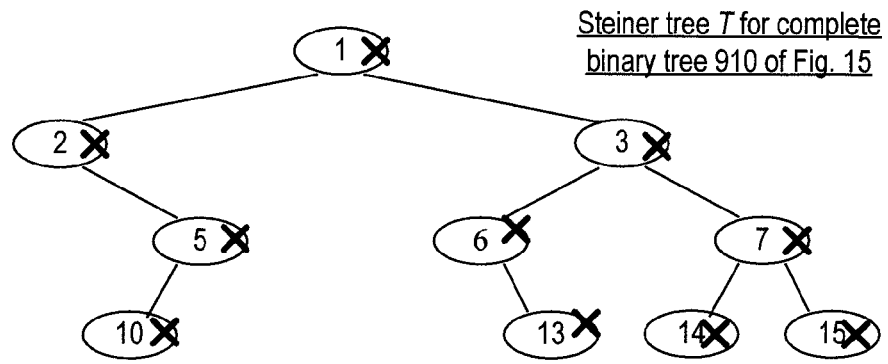

The meeting points can also be defined as follows. Recall that in the art, a Steiner tree T of a subset S of vertices of an unweighted tree TR is the unique minimal-sized tree containing each vertex of S. Suppose we compute the Steiner tree T of the subset R of the complete binary tree 910. FIG. 15 shows an example of a complete binary tree 910, and FIG. 16 shows the corresponding Steiner tree. The Steiner tree can be computed simply by removing, from the complete binary tree 910, the unrevoked nodes (i.e. the unrevoked leafs and any nodes on a path from an unrevoked leaf to the root) and also removing any incident edges to the unrevoked nodes. (For example, the Steiner tree can be computed as follows: mark each unrevoked leaf; then, proceeding up the tree, mark an internal node if both its children are marked; finally, remove all the marked nodes as well as any incident edges to those nodes.) Then the meeting points are defined to be the leaves of T (nodes 10, 13, 14, 15 in FIG. 16) together with the internal nodes v of the complete binary tree 910 for which both L(v) and R(v) are non-empty in T(nodes 1, 3, 7 in FIG. 15). We refer to the latter nodes as internal meeting points.

As should be clear from the discussion above in connection with FIG. 14, it is sufficient to compute the optimal coverings for the meeting points. The number of meeting points is 2r−1 (as can be proven by induction on r), so the asymptotic time complexity can be reduced.

Appendix 5 shows a method OptimalCoverM(v,$f_v$,$\epsilon$) which is a modification of the OptimalCover method of Appendix 2. Here $\epsilon$ is as in (10). The method of Appendix 5 traverses just the meeting points at step 3. For each non-leaf meeting point v, the function MPleft(v) returns the lowest height meeting point in v's left subtree L(v). MPright(v) returns the lowest-height meeting point in the right subtree R(v). We note that in any subtree, the lowest-height meeting point is uniquely defined. Indeed, if there were two meeting points $v_1, v_2$ of the lowest height, then their paths to the root of the subtree would meet at another meeting point having a still lower height. This is a contradiction because the entire paths to the root of the subtree, and hence the paths' meeting point, must lie in the subtree.

At step (3a) of Appendix 5, we determine the optimal covers OptimalCoverM(x,$f_v$,$\epsilon'$) and OptimalCoverM(y,$f_v$−$f_L$, $\epsilon'$) using a parameter $\epsilon'$ which can be smaller than $\epsilon$ if $\epsilon>0$. In order to obtain the optimality condition (10) with the $\epsilon$ value for the root (v=1), we may have to use a smaller value $\epsilon'$ for the subtrees at step (3a). This is further explained below in connection with Appendix 10.

Regarding step (3b) of Appendix 5, the optimal covering for the node v is the union of the covers for nodes x,y together with the siblings of the nodes x,y on the respective paths from x, y to v. (E.g., in FIG. 14, the optimal covering for v is the union of the optimal coverings for $v_m, w_s$ together with the nodes $v_2', \ldots, v_m'$ and $w_2', \ldots, w_s'$.) The siblings are denoted as Conodes: for any node $x \in T(v)$, Conodes(x,v) denotes the set of siblings of all the nodes on the path from x to v, including x but not v. If v is the root, it can be omitted, i.e. Conodes(x)=Conodes(x, 1).

Clearly, |Conodes(x,v)|=height(x)−height(v).

Since the root may or may not be a meeting point, the method of Appendix 1 can be modified as shown in Appendix 6, to first find the lowest-height meeting point $v_M$ in the complete binary tree 910 (step 2A of Appendix 6).

Appendix 7 shows a method OptimalCoverSizeM obtained by modifying OptimalCoverSize of Appendix 3. Only step 4 is shown. Appendix 8 shows a method FreeRidersM obtained by modifying FreeRiders of Appendix 4. In both methods, only the meeting points are traversed.

In some embodiments, before the optimal coverings are computed, an ordered list of meeting points is created, in the increasing or decreasing order of heights. The meeting points of the same height can appear in any order. Then the meeting point traversal is more efficient. We will now describe such methods.

Throughout, we will assume that r>1, since if r=1 there is nothing to prove (if there is only one revoked user, we can simply make him a free rider for the optimal solution). We also assume $\epsilon \geq 1$.

Method for Finding the Meeting Points

Since r>1, we can root the Steiner tree T (FIG. 16) at an internal meeting point. We choose to root T at the meeting point of smaller height in the complete binary tree 910 (such as the tree of FIG. 15). As explained above, such meeting point is unique.

One embodiment of a method for computing the meeting points is given in Appendix 9. Without loss of generality, we can assume that the revoked set R given to our algorithms is a list of integers in the range $\{n, n+1, \ldots, 2n-1\}$. See FIG. 9. For example, in FIG. 15, R={10,13,14,15}. We first apply an efficient sorting algorithm sort to R as the input list for R may be unsorted. See step 1 of Appendix 9. The best known integer sorting algorithms in the art run in expected time $O(r\sqrt{\log\log r})$ [19] and worst-case time O(r log log r) [18], though more practical ones running in time O(r log r) or O(r log log n) are also know in the art, and can be based on textbook algorithms [17] or van Emde Boas trees.

Figure 17:
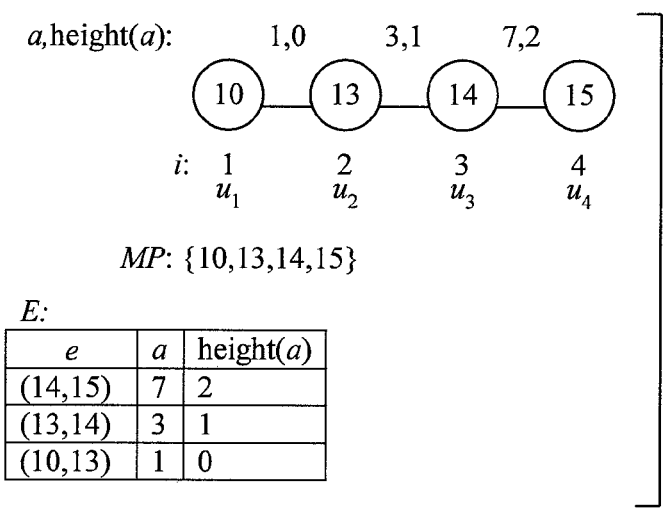

For illustrative purposes, one may visualize our algorithmic method for computing the meeting points by envisioning a line containing r points (such as the line with four points 10, 13, 14, 15 in FIG. 17 for the complete binary tree 910 of FIG. 15). The ith point is $u_i$, the ith revoked user in the given sorted list. The edge $(u_i, u_{i+1})$ is labeled as follows: we find $a=a(u_i, u_{i+1})$, and we label $(u_i, u_{i+1})$ with both a and height(a), referring to the latter as the edge weight. Thus, in FIG. 17, the edge (10,13) is labeled with a=1, height(a)=0; the edge (13,14) is labeled with a=3, height(a)=1, and so on. Note that a and its height can be found using O(log log n) arithmetic operations via a binary search on the binary expansions (i.e. binary representations) of $u_i$ and $u_{i+1}$. Then a is an internal meeting point with $u_i \in L(a)$ and $u_{i+1} \in R(a)$.

Figure 18:
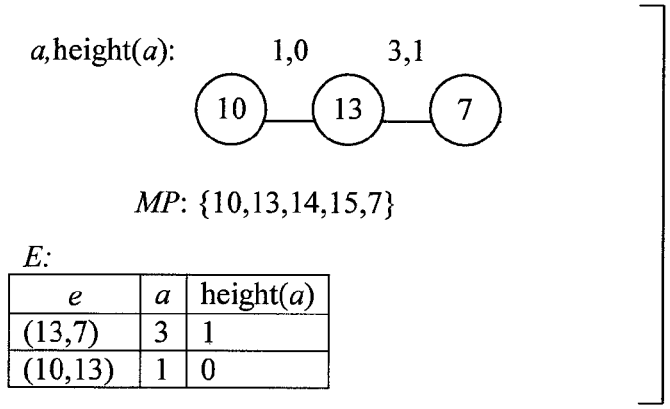

We maintain a sorted list E of edges and the corresponding pairs (a,height(a)). The edges are denoted as e in Appendix 9 (step 2). At step 3, the list is sorted by decreasing heights. FIG. 17 shows the initial state of list E for FIG. 15. We also maintain an output list MP of meeting points. MP is initialized to the set of revoked users ({10,13,14,15} in FIG. 17) at step 1 of Appendix 9. We then find the edge e={u,v} of largest weight (e={14,15} in FIG. 17) in the list E, breaking ties arbitrarily (step (4a) in Appendix 9), add a(u,v) to the end of MP, and delete e from E (step (4b)). This corresponds to collapsing the edge {u,v} on the line and replacing it with the vertex a(u,v). See FIG. 18, showing the state of the variables after the first iteration. At step (4c), in each edge e' containing u or v, we replace u or v with a(u,v), and update the weight and ancestor labels e'.w, e'.a See step (4c) in Appendix A. We will show that during any iteration, the "line structure" of the remaining edges E is preserved, so that any vertex u on the line can belong to at most 2 edges, and thus this update step can be done efficiently. After r−1 deletions, the entire line is collapsed into a single vertex, the root of the Steiner tree, and we are done.

We first establish some properties of MeetingPoints. These properties are included for illustrative purposes to show the algorithm's correctness and the running time requirements. The invention may be practiced without consideration of these properties.

Lemma 5 The nodes in MP are sorted in order of non-increasing height.

Proof: Suppose this is not true. Consider the first vertex u occurring before a vertex v in MP with height(u)<height(v). Then u,v are internal meeting points, so they were added to MP by collapsing some edges e, $e'=\{\alpha,\beta\} \in E$, respectively. Consider the iteration when u is added to MP, that is, when e is removed from E. Then $e' \notin E$ since e'.w=height(v)>height(u)=e.w, and E is sorted, so e' would have been chosen instead of e. But e' eventually occurs in E, so there must be an edge $e'' \in E$ for which e''.a is a descendant of either $\alpha$ or $\beta$. But then e''.w>e.w, a contradiction.

Corollary 6 The edges are deleted from E in order of non-decreasing weight.

The next lemma shows that the "line structure" of E is preserved. For an edge E={u,v}, we will write it as (u,v) if u is to the left of v.

Lemma 7 Let V=V(E) denote the nodes occurring in some edge in E during any fixed iteration. The graph G=(V,E) is a line, and if u, $v \in V$ with u<v (as integers), then u is to the left of v.

Proof: This holds at the end of step (3) by construction. To see that this property is maintained, suppose that in some iteration e=(u, v) is removed from E. Then in step (4c) only two entries of E may be modified, namely, an edge of the form (u', u) and an edge of the form (v, v'). These edges, if they exist, change to (u', a(u, v)) and (a(u, v), v'). We will show that u' is to the left of a(u, v). The proof that a(u, v) is to the right of v' is similar.

Since the property held before e was removed, u' is to the left of u. Since e was removed before (u', u), we have height(a(u', u))>height(a(u, v)) by Corollary 6. It follows that either $a(u, v) \in R(a(u', u))$, in which case u' is to the left of a(u, v), or a(u, v)=a(u', u). But if a=a(u, v)=a(u', u), it is impossible for u' to be to the left of u and u to be to the left of v, since the tree is binary so two elements of {u', u, v} must occur in either L(v) or R(v), and thus their common ancestor of largest height cannot be a. The above properties enable us to analyze the output of MeetingPoints.

Lemma 8 MP is exactly the set of meeting points.

Proof: First, we claim that every meeting point occurs in MP. This is clearly true for the set R, so suppose to the contrary, that some internal meeting point v does not occur in MP. Let v be such a node of maximal height. Further, let $p_l$ be the nearest meeting point to v in L(v), and similarly define $p_r$. Then both $p_l$ and $p_r$ occur in MP since v is of maximal height.

We claim that if the edge $(p_l, p_r)$ ever occurs in E, then $v \in MP$. Indeed, if not, then either $p_l$ or $p_r$ is replaced by an ancestor other than v. But since $a(p_l, p_r)=v$, any ancestor a of $p_l$ or $p_r$ is either a descendant or ancestor of v, and since there are no meeting points on the path from $p_l$ to v and the path from $p_r$ to v other than the endpoints, a must be an ancestor of v. But then the edge contracted when a is added to MP has weight larger than $(p_l, p_r)$ contradicting Corollary 6.

Finally, we show that $(p_l, p_r)$ occurs in E. Consider the iteration immediately after $p_l$ is added to MP. Then, since $p_r$ is later added to MP, there must be some vertex $w \in T(p_r)$. Since $p_l$ is necessarily to the left of w, by Lemma 7 there is an edge $(p_l, w') \in E$. Note that a $(p_l, w')$ is an ancestor of $p_l$, and since $p_l$ is closest to v, height$(a((p_l, w')))\leq$height(v). It follows that $(p_l, w')$ cannot be deleted from E until $p_r$ is added to MP, since height$(p_r)<$height(v). Now we know that $p_l<w'\leq p_r$ as integers, and so height(v)=height$(a(p_l, p_r))\leq$height$(a(p_l, w'))$, so that height(v)=height$(a(p_l, w'))$, and as $p_l$ can only have one ancestor of a given height, $a(p_l, w')=v$. This means that $w' \in R$ (v) and thus $w'=p_r$, as otherwise $p_r$ would not be the nearest meeting point to v in R(v). Thus $(p_l, p_r) \in E$, and the proof is complete.

We say that a list of meeting points is ordered if for each meeting point v, its unique closest meeting points $p_l$ and $p_r$, in L(v) and R(v) respectively, precede v in the list. The next lemma follows immediately from Lemma 5 and Lemma 8.

Lemma 9 MP is ordered.

We summarize our findings thus far.

Theorem 10 MeetingPoints outputs an ordered list of meeting points in time O(r log log n).

Proof: From Lemmas 8 and 9, all that is left to show is the time complexity.

Given nodes u and v, it is not hard to see that both a(u, v) and height(a(u,v)) can be computed with O(log log n) operations using a binary search, e.g., by dividing by powers of $2^i$ and checking for equality. Thus, steps (1-3) can be done in O(r log log n) time. As for step (4), note that |E|=r initially, and in each iteration it drops by one. Further, because of Lemma 7, we know there are at most 2 different e' encountered in step (4c). Further, each execution of step (4ciii) can be done in O(log log n) time using standard van Emde Boas trees. Thus, the total time complexity is O(r log log n).

Method for Computing Optimal and Near-Optimal Freerider Set

Appendix 10 shows a Freerider-Approx method which makes use of the subroutines MeetingPoints and MinSum (see section MinSum hereinabove). We remark that when $\epsilon=0$ in (10), the MinSum algorithm produces an exact answer in time $$O\left(\frac{m_1 m_2}{\log(m_1 + m_2)}\right).$$

If we permit $\epsilon>0$ it might be possible to obtain a faster algorithm, though the answers may no longer be optimal (but may be close to optimal).

For an integer i and any tree S, we let opt(i,S) denote the optimal cost (the size of the minimum covering) of assigning at most i free riders to the tree S.

A word about the approximation error is in order. Suppose we want an assignment of free riders which has cost at most $(1+\epsilon)$ times that of the optimal assignment. It is clear that any simple path in the Steiner tree T on R has length at most min(r, log n). Put $$\epsilon'=\epsilon/(2 \min(r, \log n)) \quad (11)$$

as is done at step 2 of Appendix 10. Then if for each dynamic programming step we invoke MinSum with parameter $\epsilon'$, we can show that the final assignment found by Freerider-Approx is at most $(1+\epsilon')$ times that of the optimum.

For each vertex $v \in MP$=MeetingPoints(R) with $v \notin R$, we assume that the two meeting points x, y for which v=a(x,y) can be determined in constant time. This is easily achieved by keeping pointers in the implementation of MeetingPoints. For example, each entry in MP for an internal meeting point can include the meeting point, v and indices of the meeting points x and y in MP. The indices can be stored at steps (4a), (4b) in Appendix 9, when e={x,y} is selected and appended to MP. Let MPleft(v) be the operation returning x, and MPright(v) the operation returning y.

In our algorithm each node u has three data fields $r_u$, $A_u$, and $B_u$ associated with it. As before, $r_u$ denotes the number of revoked users in the tree T(u). $A_u[i]$ is similar to the fields "TBL1[u,i].Size" and "TBL2[u,i].Size" in FIGS. 10, 11. More precisely, $A_u$ is an array, indexed from $0 \leq i \leq \min(f, r_u)$, which records the cost found by our algorithm of assigning at most i freeriders to $R \cap T(u)$. In view of (10), $$A_u[i] \leq (1+\epsilon') \text{opt}(i, T(u)). \quad (12)$$

Finally, $B_u$ is a companion array to $A_u$ to store the $f_{Lmin}$ values. $B_u[i]$ is the $f_{Lmin}$ value when at most i free riders are assigned to node u (similar to TBL2[u,i].$f_{Lmin}$ in FIG. 11). More precisely, $B_u$ is an array, indexed from $0 \leq i \leq \min(f, r_u)$, such that for internal meeting points u, we have the property that $$A_u[i] = A_{MPleft(u)}[B_u[i]] + A_{MPright(u)}[i - B_u[i]]. \quad (13)$$

Observe that |MP|=2r−1.

At step 3 (Appendix 10), the $r_u$ value is set to 1 for each revoked node, and $A_u[0]$ and $A_u[1]$ are set to 0.

At step 4, the internal meeting points are traversed from bottom up in the tree, i.e. in order of decreasing height. This step is similar to step 4 of Appendix 7, but there is no need for recursion. For each meeting point v, the closest left and right meeting points x and y are computed at step (4a) in Appendix 10. At step (4b), each entry $A_x[j]$, $0 \leq j \leq \min(f, r_x)$ is incremented by the number of siblings of the nodes between x to v, not including the nodes x and v (the number of such nodes is 0 if x=LV(v)). See the discussion of FIG. 14 above. Hence, $A_x[j]$ becomes equal to the optimal or near-optimal cost of assigning at most j free riders to the left child of v. Also, $A_x[r_x]$ is set to 1 if $r_x \leq f$ and the corresponding optimal cost is not 0 (i.e. P(x) is not empty).

At (4c), similar operations are performed on $A_y$.

At (4d), the $f_{Lmin}$ values $B_v[j]$ are computed for each $j \leq \min(f, r_v)$ for $\epsilon'$.

At (4e), the $r_v$ value is computed.

At (4f), for each j such that $0 \leq j \leq \min(f, r_v)$, the value $A_v[j]$ is computed as the sum of the optimal or near-optimal costs for the left and right children of v for the $f_{Lmin}$ value corresponding to j. However, if $r_v \leq f$ and $A_v[r_v]$ is not 0, then $A_v[r_v]$ is set to 1.

Step (5) is performed after the meeting point traversal. This step outputs the total cost as the cost of the near-optimal cover for the lowest-height meeting point for at most f free riders, plus the number of siblings of the nodes starting with that meeting point and up to the root node (including the meeting point).

Step (6) traverses the meeting points to output the free rider assignment. In some embodiments, step (6) is similar to Appendix 8. At step (2A) of Appendix 8, $v_M$ could be just set to MP[2r−1]. At step (4a), the condition P(v)=Ø can be replaced with $A_v[ff[v]]$=0. At step (4c1), the $f_{Lmin}$ value on the right is simply $B_v[ff[v]]$.

The following theorem states that the FreeRider-Approx method produces a free rider assignment whose cost is at most $(1+\epsilon)$ times the optimum cost. Again, the invention may be practiced without reference to this theorem (or its proof). However, it is included for illustrative purposes to convince one of ordinary skill in the art that the algorithm is indeed correct and works within the specified performance bound.

Theorem 11 Freerider-Approx outputs an assignment of freeriders with cost at most $(1+\epsilon)$ times that of the optimum.

A proof of this theorem, as well as Lemma 12 and Theorem 13 below, can be found in the aforementioned U.S. provisional patent application No. 60/739,657. See also [21].

Lemma 12 For any node v in the complete binary tree scheme and for any non-negative integer i, the cost of optimally assigning at most i free riders to leaves of T(v) is at most log n more than the cost of optimally assigning at most i+1.

Theorem 13 The time complexity of Freerider-Approx is $O(r(f^2/\log f + \log \log n))$ if $\epsilon \geq 0$.

While we have provided a method for computing the optimal free-rider set for the complete binary subtree approach, one of ordinary skill in the art will recognize that the same techniques can be applied to other tree-like and non-tree schemes. For example, one can apply the technique to k-ary schemes by "binarizing" them; that is, by replacing a degree-k node with a tree on k-leaves. Similarly, one may apply the techniques to the Subset-Difference Method of Naor, Naor, and Lotspiech as well as the Layered Subset Difference Method of Shamir and Halevy. The main modification is that in the dynamic programming step, for which you just need to be careful if a key involving the joining node should be included.

The methods discussed above can be performed using different types of dedicated and/or general-purpose computer systems, including imbedded systems (such as present in microwave ovens, mobile telephones, and other devices). Such systems may be based on prior art hardware such as present in systems 210, 104, 610, 620 in FIGS. 2A-6B. A computer system may contain one or more computer processors executing computer instructions, and may contain computer storage (semiconductor memory, magnetic or optical disks, and/or other types of storage) to store instructions and data. Thus, the system may be a hardware apparatus (e.g., circuitry, dedicated logic, etc.), software (such as is run on a general purpose computer system or a dedicated machine), or a combination of both. It may include a processor coupled to the external network interface and the memory wherein the processor receives a broadcast encrypted using a plurality of keys associated with the set system, and is capable (if it has not been revoked or is part of the free rider set) of decrypting this broadcast. The broadcast may comprise two parts: a broadcast header which encrypts a broadcast session key using the keys from the set system associated to the broadcast encryption scheme, and data content encrypted using the session key. The (non-revoked or free-rider) client computer system will know one or more keys from the exclusive set system that can be used to decrypt the contents of the header, obtain the session key, and then decrypt the data contents of the transmission.

The computer system may be a server which includes an external network interface through which an encrypted broadcast (typically comprising a broadcast header which encrypts a broadcast session key using the keys from the broadcast encryption system accessible to the non-revoked users and the free riders, and data content encrypted using the session key) can be sent; and a processor coupled to the external network interface and the memory wherein the processor constructs a broadcast transmission using the keys associated with the non-revoked users and free riders in accordance with the underlying broadcast encryption scheme.

The computer system may include a display device, such as a cathode ray tube (CRT) or liquid crystal display (LCD), coupled to the bus for displaying information to a computer user. An alphanumeric input device, including alphanumeric and other keys, may also be coupled to the bus for communicating information and command selections to the processor. An additional user input device is cursor control, such as a mouse, trackball, trackpad, stylus, or cursor direction keys, coupled to the bus for communicating direction information and command selections to the processor, and for controlling cursor movement on the display.

Note that any or all of the components of the system and associated hardware may be used in the present invention. However, it can be appreciated that other configurations of the computer system may include some or all of the devices.

The invention is not limited to the embodiments discussed above or in the Appendices below. The invention is not limited to algorithms satisfying any particular time complexity bounds, or to using any particular data values. For example, the parameter $f_{Lmin}$ can be replaced with $f_{Rmin} = f_v - f_{Lmin}$. Further, some embodiments use non-binary trees without even binarizing them. In some such embodiments, for each node v, optimal or near-optimal covers are found for the subtrees rooted in the immediate children of v so as to provide an optimal or near-optimal cover for T(v). In some embodiments, a computer system (e.g. a server) obtains computer data representing a set U of entities and a target set P which is a subset of U. The target set P may be the set of the privileged users or, on the contrary, the set of revoked users (e.g. if the server desires to transmit some information, e.g. some advertisement offers, to just the revoked users, or if the server desires to transmit invalidity proofs for invalid certificates). The computer data also represent a set system CC(U). The set system is a set of subsets of U. The set system CC(U) does not have to be a subset cover (as in Definition 2). For example, in some embodiments, the set system CC(U) does not include all the singleton sets (or even does not include any singleton sets), and hence does not provide a covering C(P) for any subset P of U.

Each element $S_i$ of the set system may be associated with data (e.g. $k_S$ in FIGS. 4A, 6A) which can be used to form messages (e.g. $E2_{k_s}(bk)$ or $c_m$) for transmission.

The computer data also represents a maximum positive number f of free riders to be allowed in constructing an f+-redundant cover CV=CV(f,P) for the target set P. For example, CV may be T(1,f,P, U). The information represented by the computer data can be represented in different ways. For example, the number f can be specified by the parameter given by (1), and can be computed from that parameter by the computer system.

The computer system then performs a free-rider assignment by designating at least zero and at most f entities of R=U\P as free riders, wherein performing the free-rider assignment comprises, for at least one subset v which is an element of the set system CC(U), and for at least one positive number $f_v \leq f$, determining a cost of an $f_v$+-redundant cover of v. A cost of any cover is a non-constant, non-decreasing function of the number of elements in the cover. In some embodiments, the cost of any cover is exactly the number of elements in the cover (the non-decreasing function is the identity function), but other options are also possible.

Determining the cost of the $f_v$+-redundant cover of v comprises:
- A. Determining disjoint non-empty subsets $x_1, x_2, \ldots$ which are subsets of v and are elements of the system CC(U). For example, in Appendix 2, step 3, $x_1$ is the set of all users (leafs) in L(v), and $x_2$ is the set of all users in R(v). In Appendix 10, $x_1$ is the set of all users in T(x), and $x_2$ is the set of all users in T(y).
- B. Selecting two or more tuples of numbers $(f_1, f_2, \ldots)$ of non-negative integers $f_1, f_2, \ldots$, wherein the sum of the numbers in each tuple does not exceed $f_v$, each tuple representing a candidate assignment of at most $f_i$ free riders to $x_i$ for each $i=1, 2, \ldots$ to obtain an $f_v$+-redundant cover of v. For example, in Appendix 2, $f_1 = f_L$, and $f_2 = f_V - f_L$. In Appendix 10, step (4d) $f_1$ and $f_2$ are indices for which the MinSum finds a minimal (or near-minimal) sum $A_x[f_1] + A_y[f_2]$. In Appendices 2 and 10, $f_1 + f_2 = f_v$ for all combinations of $f_1$ and $f_2$, but in some embodiments the sum of the numbers $f_1, f_2, \ldots$ can be smaller than $f_v$.
- C. Selecting, from said tuples, a tuple for which the corresponding candidate assignment provides an optimality cost of an $f_v$+-redundant cover of v, wherein an optimality cost is a cost having a predefined optimality relation to a minimum cost. In some embodiments, the optimality cost is a cost which is at most $(1+\epsilon)$ times the minimum cost, where $\epsilon \geq 0$ is predefined. In some embodiments, $\epsilon < 1$.

In some embodiments, the elements v, $x_1, x_2$ are meeting points. The meeting points were defined above in the context of tree data structures (FIG. 14), but the invention can be described without using trees. We can define a parent-child relationship in CC(U) as follows: an element $e_1$ of CC(U) is a child of $e_2 \in CC(U)$ if $e_1$ is a proper subset of $e_2$. The element $e_1$ is an immediate child of $e_2$ if $e_1$ is a proper subset of $e_2$ and there is no element $e_3$ in CC(U) which would contain $e_1$ as a proper subset and which would be a proper subset of $e_2$. A meeting point is a CC(U) element which either: (a) has at least two immediate children in CC(U) each of which comprises an element of R, or (b) consists of a single entity which is an element of R.

In some embodiments, the operation of determining the disjoint non-empty subsets $x_1, x_2, \ldots$ comprises searching for at least two meeting points of v and finding $x_1$ and $x_2$ as a result of the searching. See, for example, step (4a) in Appendix 7 or 10.

In some embodiments, operations A-C are performed for multiple positive numbers $f_v$, and one of said numbers $f_v$ is selected to provide a near-optimal cost for the cover CV(f,P). For example, in Appendix 2, selection of $f_v$ corresponds to the selection of $f_{Lmin}$. In Appendix 10, the selection is performed at step (4d).

Some embodiments provide a method for computing an order set MP of meeting points. The meeting points being ordered by their heights, e.g. by non-decreasing or non-increasing heights. A meeting point's height represents a number of elements of CC(U) in a chain of elements beginning with the meeting point and ending with the chain's last element which is not a subset of any element of CC(U), with each element except the last element in the chain being an immediate child of the chain's next element. In some embodiments, the last element is the set U.

In some embodiments, computing the set MP of all the meeting points comprises:
- (1) Initializing the set MP to a sequence $u_1, u_2, \ldots, u_r$ of elements of CC(U) such that each element $u_i$ (i=1, 2, ..., r) consists of a respective single element of R, where r>1. In the embodiment of Appendix 9, step 1, the sequence is sorted in the order of position (left-to-right) in the complete binary tree (FIG. 15). However, the invention can be defined without referring to trees. The sequence of the singleton sets $u_1, u_2 \ldots$ can be in some order such that for each element $u_i$, either $a(u_i, u_{i+1})$ or $a(u_{i-1}, u_i)$ has a maximum height of all the elements $a(u_i, v)$ such that $v \in CC(U)$ is different from $u_i$ and consists of a single element of R, wherein for any two elements u,v of CC(U), a(u,v) denotes a CC(U) element having a maximum height of all elements containing both u and v.
- 2) Defining a set E of pairs of elements of CC(U), and initializing the set E to a set of all the pairs of adjacent elements $\{u_i, u_{i+1}\}$, $i=1, \ldots, r-1$.
- 3) Removing, from the set E, a pair $\{u_i, u_{i+1}\}$ for which the element $a(u_i, u_{i+1})$ has a maximum height of all pairs in E.
- 4) For the pair removed, appending the element $a(u_i, u_{i+1})$ to the set MP.
- 5) If the set E still contains at least one pair comprising an element $u_i$ or $u_{i+1}$ of operation (3), then replacing each such element $u_i$ or $u_{i+1}$ in each such at least one pair with the element $a(u_i, u_{i+1})$ of operation (4).

The invention is not limited to particular data structures or operations. Other embodiments and variations are within the scope of the invention, as defined by the appended claims.

The following references are incorporated herein by reference. The references may or may not be prior art with respect to the present application.

- [1] M. Abdalla, Y. Shavitt, and A. Wool. Key Management for Restricted Multicast Using Broadcast Encryption. In *ACM Trans. on Networking*, vol 8, no. 4, pages 443-454.2000.
- [2] W. Aiello, S. Lodha, and R. Ostrovsky. Fast digital identity revocation. In *In proceedings of Asiacrypt '01*, 2001.
- [3] U. Feige. *A threshold of lnn for approximating set cover*, JACM, 1998, pp. 634-652.
- [4] A. Fiat and M. Naor. *Broadcast encryption*, Crypto, 1993, pp. 480-491.
- [5] E. Gafni, J. Staddon, and Y. L. Yin. *Efficient methods for integrating traceability and broadcast encryption*, Crypto, 1999, pp. 372-387.
- [6] S. Jukna. Extremal Combinatorics with Applications in Computer Science, Springer-Verlag, 2001.
- [7] R. Kumar, S. Rajagopalan, and A. Sahai. *Coding constructions for blacklisting problems without computational assumptions*, Crypto, 1999, pp. 609-623.
- [8] R. Kumar and A. Russell. *A note on the set systems used for broadcast encryption*, SODA, 2003, pp. 470-471.
- [9] J. Lotspiech, D. Naor, and M. Naor. *Revocation and tracing schemes for stateless receivers*, Crypto, 2000, pp. 41-62.
- [10] M. Luby and J. Staddon. *Combinatorial Bounds for Broadcast Encryption*, Eurocrypt, 1998, pp. 512-526.
- [11] C. Lund and M. Yannakakis. *On the hardness of approximating minimization problems*, JACM, 1994, pp. 960-981.
- [12] S. Micali. Efficient Certificate Revocation. MIT/LCS/TM 542b, Massachusetts Institute of Technology, 1996.
- [13] S. Micali. Efficient Certificate Revocation. In *Proceedings of the RSA Data Security Conference*, 1997. Also U.S. Pat. No. 5,666,416.
- [14] S. Micali. NOVOMODO: scalable certificate validation and simplified PKI management. In *Proceedings of the 1st Annual PKI Research Workshop*, 2002.
- [15] T. M. Chan. *All-pairs shortest paths with real weights in $O(n^3/\log n)$ time*. In Proc 9th WADS, LNCS 3608, pp. 318-324, 2005.
- [16] J. Erickson. Blog. Post at http://3dpancakes.typepad.com/ernie/2005/08/chans-technique.html
- [17] T. H. Cormen, C. E. Leiserson, and R. L. Rivest. Introduction to Algorithms, 1990, The MIT Press/McGraw-Hill.
- [18] Y. Han. *Deterministic sorting in $O(n \log \log n)$ time and linear space*. Journal of Algorithms, 2004, pp. 96-105.

[19] Y. Han and M. Thorup. *Sorting in* $O(n\sqrt{\log\log n})$ *expected time and linear space*. FOCS, 2002, pp. 135-144.
[20] D. Naor, M. Naor and J. Lotspiech. Revocation and Tracing Schemes for Stateless Receivers. In *Proc. Of Crypto* 2001, LNCS 2139, Pages 41-62. Springer-Verlag, 2001.
[21] Z. Ramzan and D. P. Woodruff. Fast Algorithms for the Free Riders Problem in Broadcast Encryption. In *Proc. Of Crypto* 2006.

APPENDIX 1

1. Initialize.
2. T(1,f)←OptimalCover(1,f).
3. Perform network transmissions for the sets in T(1,f).cover as needed.

END OF APPENDIX 1

APPENDIX 2

OptimalCover(v, $f_v$)
   Input: v is tree node.
     $f_v$ is the maximum number of free riders.
   Output: Tout={Tout.cover, Tout.size} is the optimal cover.
1. If $f_v$=0 or P(v)=Ø,
   (a) Tout.cover←BasicCover(v).
   (b) Tout.size←|BasicCover(v)|.
   (c) Output Tout and exit.
2. If $f_v \geq r_v$,
   (a) Tout.covers←{v}.
   (b) Tout.size←1.
   (c) Output Tout and exit.
3. Let $f_L$ be a candidate maximum number of free riders for LV(v), and $f_v - f_L$ be the candidate maximum number of free riders for RV(v).
(a) Find $f_L$ which minimizes OptimalCover($LV(v), f_L$).size+OptimalCover($RV(v), f_v - f_L$).size Denote this $f_L$ as $f_{Lmin}$, i.e.

OptimalCover($LV(v), f_{Lmin}$).size+OptimalCover($RV(V), f_v - f_{Lmin}$).size=min (OptimalCover($LV(v), f_L$).size+OptimalCover($RV(v), f_v - f_L$).size) $0 \leq f_L \leq f_v$ Denote the corresponding covers by TL and TR, i.e.
   TL=OptimalCover(LV(v),$f_{Lmin}$), TR=OptimalCover(RV(v),$f_v - f_{Lmin}$).
(b) 1) Tout.size←TL.size+TR.size.
   2) Tout.cover←TL.cover ∪ TR.cover.
   3) Output Tout and exit.

END OF APPENDIX 2

APPENDIX 3

OptimalCoverSize(v, $f_v$)
   Input: v is tree node.
     $f_v$ is the maximum number of free riders.
1. TBL2[v,$f_v$].Define←TRUE.
2. If $f_v$=0 or P(v)=Ø,
   (a) TBL2[v,$f_v$].Size←|BasicCover(v)|.
   (b) Exit.
3. If $f_v \geq r_v$,
   (a) TBL2[v,$f_v$].Size←1.
   (b) Exit.

4. Let $f_L$ be a candidate maximum number of free riders for LV(v), and $f_v - f_L$ be the candidate maximum number of free riders for RV(v).
(a) Find $f_L$ which minimizes OptimalCoverSize($LV(v), f_L$)+OptimalCoverSize($RV(v), f_v - f_L$)

Denote this $f_L$ as $f_{Lmin}$, i.e.

OptimalCoverSize($LV(V), f_{Lmin}$)+OptimalCoverSize($RV(v), f_v - f_{Lmin}$)=min (OptimalCoverSize($LV(v), f_L$)+OptimalCoverSize($RV(v), f_v - f_L$)) $0 \leq f_L \leq f_v$ Denote the corresponding sizes as TLSize and TRSize, i.e.

TLSize=OptimalCoverSize($LV(v), f_{Lmin}$), TRSize=OptimalCoverSize($RV(v), f_v - f_{Lmin}$).

(b) (1) TBL2[v.$f_v$].Sizes←TLSize+TRSize.
   2) TBL2[v.$f_v$].$f_{Lmin}$←$f_{Lmin}$
   (3) Exit.

END OF APPENDIX 3

APPENDIX 4

FreeRiders
1. F←Ø.
2. OptimalCoverSize(1,f).
3. ff[1]←f
4. Traverse the tree's internal nodes from the top down (e.g. in the Breadth First Search order). For each internal node v, compute ff for the left and right children LV(v) and RV(v):
(a) If ff[v]=0 or P(v)=Ø, then skip the children of v in tree traversal, and go to the next node in tree traversal (no free riders in T(v)).
(b) If ff[v]$\geq r_v$,
   (1) Add all revoked nodes in T(v) to F.
   (2) Skip the children of v in tree traversal, and go to the next node in tree traversal.
(c) (1) ff[LV(v)]←TBL2[v,ff[v]].$f_{Lmin}$
   (2) ff[RV(v)]←ff[v]−ff[LV(v)]
5. T(1,f).cover←BasicCover(1,P ∪ F,U).
   T(1,f).size+←|BasicCover(1,P ∪ F,U)|.

END OF APPENDIX 4

APPENDIX 5

OptimalCoverM(v,$f_v$,ϵ)
. . .
3. (a) x←MPleft(v), y←MPright(v).

Let $f_L$ be a candidate maximum number of free riders for x, and $f_v - f_L$ be the candidate maximum number of free riders for y.
   Find $f_L$ for which OptimalCoverM($x, f_L, \epsilon'$).size+OptimalCoverM($y, f_v - f_L, \epsilon'$).size is near-optimal under (10). Denote this $f_L$ as $f_{Lmin}$, i.e.

OptimalCoverM($x, f_{Lmin}, \epsilon'$).size+OptimalCoverM($y, f_v - f_{Lmin}, \epsilon'$).size$\leq$(1+$\epsilon'$)min(OptimalCoverM($x, f_L, \epsilon'$).size+OptimalCoverM($y, f_v - f_L, \epsilon'$).size) $0 \leq f_L \leq f_v$ Denote the corresponding covers by TL and TR, i.e.

TL=OptimalCoverM($x, f_{Lmin}, \epsilon'$), TR=OptimalCoverM($y, f_v - f_{Lmin}, \epsilon'$).

(b) (1) Tout.size←TL.size+TR.size+height(x)+height(v)−2·height(v)−2.
  2) Tout.cover←TL.cover ∪ TR.cover ∪ Conodes(x,LV(v)) ∪
Conodes(y,RV(v)).
  3) Output Tout and exit.

END OF APPENDIX 5

APPENDIX 6

1. Initialize.
2A. Find the meeting point $v_M$ of the lowest height.
2B. ToptM←OptimalCoverM($v_M$,f,$\epsilon$).
2C. T(1,f).cover←ToptM.cover ∪Conodes($v_M$).
2D. T(1,f).size←ToptM.size+height($v_M$).
3. Perform network transmissions for the sets in T(1,f).cover as needed.

END OF APPENDIX 6

APPENDIX 7

OptimalCoverSizeM(v,$f_v$,$\epsilon$)
. . .
4. (a) x←MPleft(v), y←MPright(v).
Let $f_L$ be a candidate maximum number of free riders for x, and
$f_v$−$f_L$ be the candidate maximum number of free riders for y. Find $f_L$ for which OptimalCoverM(x,$f_L$,$\epsilon'$).size+OptimalCoverM(y,$f_v$−$f_L$,$\epsilon'$).size is near-optimal under (10). Denote this $f_L$ as $f_{Lmin}$, i.e.

OptimalCoverSizeM(x,$f_{Lmin}$,$\epsilon'$)+OptimalCoverSizeM(y,$f_v$−$f_{Lmin}$,$\epsilon'$)≦(1+$\epsilon$)min(OptimalCoverSizeM(x,$f_L$,$\epsilon'$)+OptimalCoverSizeM(y,$f_v$−$f_L$,$\epsilon'$))
  0≦$f_L$≦$f_v$ Denote the corresponding sizes as TLSize and TRSize, i.e.

TLSize=OptimalCoverSizeM(x,$f_{Lmin}$,$\epsilon'$),

TRSize=OptimalCoverSizeM(y,$f_v$−$f_{Lmin}$,$\epsilon'$).

(b) (1) TBL2[v,$f_v$].Sizes←TLSize+TRSize+height(x)+height(y)−2·height(v).
  2) TBL2[v,$f_v$].$f_{Lmin}$←$f_{Lmin}$.
  3) Exit.

END OF APPENDIX 7

APPENDIX 8

FreeRidersM
1. F←∅.
2A. Find the meeting point $v_M$ of the lowest height.
2B. OptimalCoverSizeM($v_M$, f,$\epsilon$).
3. ff[$v_M$]←f.
4. Traverse the tree T($v_m$) from the top down (e.g. in the Breadth First Search order). Ignore the nodes other than the meeting points. For each meeting point v, compute ff for the left and right meeting points x=MPleft(v) and y=MPright(v):
(a) If ff[v]=0 or P(v)=∅, then skip the subtree T(v) and go to the next meeting point in tree traversal (no free riders in T(v)).

(b) If ff[v]≧$r_v$,
  (1) Add all revoked nodes in T(v) to F.
  (2) Skip T(v) and go to the next meeting point in tree traversal.
(c) (1) ff[x]←TBL2[v, ff[v]].$f_{Lmin}$
  (2) ff [y]←ff[v]−ff[x]
5. (a) T(1,f).cover←BasicCover($v_M$,P($v_M$) ∪ F,U($v_M$)) ∪ Conodes($v_m$);
  (b) T(1,f).size←the size of covering in (5a).

END OF APPENDIX 8

APPENDIX 9

MeetingPoints(R)
1. R←sort(R),MP←R.
2. For each adjacent pair e={$u_i$,$u_{i+1}$}∈R, set e.a=a($u_i$,$u_{i+1}$) and e.w=height (e.a).
3. Let E be the list of pairs e sorted in non-increasing order by e.w.
4. While E≠∅,
  (a) Select e as the element of E with the highest weight.
  (b) Remove e from E and append e.a to MP.
  (c) for each e'∈E with z=e' ∩ e≠∅,
    i. replace z with e.a in e'.
    ii. recompute e'.a and e'.w
    iii. reinsert e' into E, preserving sortedness
5. Output MP.

END OF APPENDIX 9

APPENDIX 10

Freerider-Approx (R,f, $\epsilon$):
1. MP←MeetingPoints(R).
2. $\epsilon'$=$\epsilon$/(2 min(r, log n)).
3. For each revoked user u, set $r_u$=1, $A_u$←(0, 0).
4. For i=r+1 to 2r−1, (i.e. for all the internal meeting points)
  (a) v←MP[i], x←MPleft(v),y←MPright(v).
  (b) Add height(x)−height (v)−1 to each entry of $A_x$.
    If $r_x$≦f and $A_x$[$r_x$]≠0, set $A_x$[$r_x$]=1.
  (c) Add height(y)−height (v)−1 to each entry of $A_y$.
    If $r_y$≦f and $A_y$[$r_y$]≠0, set $A_y$[$r_y$]=1.
  (d) $B_v$←MinSum($A_x$, $A_y$, $\epsilon'$).
  (e) $r_v$=$r_x$+$r_y$.
  (f) For each j such that 0≦j≦min(f,$r_v$), set
    $A_v$[j]=$A_x$[$B_v$[j]]+$A_y$[j−$B_v$[j]].
    If $r_v$≦f and $A_v$[$r_v$]≠0, set $A_v$[$r_v$]=1.
5. Output $A_{MP[2r−1]}$[f]+height(MP[2r−1]) as the cost.
6. Use the $B_v$'s to do a Depth-First-Search on MP to find and output the assignment.

END OF APPENDIX 10

The invention claimed is:
1. A computer-implemented method for selecting data to form messages for transmission, the messages being associated with sets of entities, the method comprising:
  (1) obtaining first computer data representing:
    (1A) a set U of the entities;
    (1B) a target set P which is a subset of U;
    (1C) a set system CS(U), the set system being a set of subsets of U;
    (1D) a maximum positive number f of free riders to be allowed in constructing an f+-redundant cover CV=CV(f,P) for the target set P, wherein the cover CV(f,P) is to consist of zero or more sets S that are elements of the set system CS(U) such that a union of the sets S comprises the target set P and at most f entities from a set R=U\P, wherein the data to be selected are data pieces associated with the elements of the cover CV;

(2) performing a free-rider assignment by designating at least zero and at most f entities of R as free riders, wherein performing the free-rider assignment comprises, for at least one subset v which is an element of the set system CS(U), and for at least one positive number $f_v \leq f$, determining a cost of an $f_v$+-redundant cover of v, wherein a cost of any cover is a non-constant, non-decreasing function of the number of elements in the cover;

wherein determining the cost of the $f_v$+-redundant cover of v comprises:

(2A) determining disjoint non-empty subsets $x_1, x_2, \ldots$ which are subsets of v and are elements of the system CS(U);

(2B) selecting two or more tuples of numbers $(f_1, f_2, \ldots)$ of non-negative integers $f_1, f_2, \ldots$, wherein the sum of the numbers in each tuple does not exceed $f_v$, each tuple representing a candidate assignment of at most $f_i$ free riders to $x_i$ for each $i=1, 2, \ldots$ to obtain an $f_v$+-redundant cover of v;

(2C) selecting, from said tuples, a tuple for which the corresponding candidate assignment provides an optimality cost of an $f_v$+-redundant cover of v, wherein an optimality cost is a cost having a predefined optimality relation to a minimum cost;

wherein the method further comprises, for each set of the f+-redundant cover, using the associated piece of data to generate a message, and transmitting the message.

2. The method of claim 1 wherein an optimality cost is a cost equal to the minimum cost.

3. The method of claim 1 wherein an optimality cost is a cost which is at most $(1+\epsilon)$ times the minimal cost, where $\epsilon$ is a predefined positive constant.

4. The method of claim 1 wherein the elements $v, x_1, x_2$ are meeting points, a meeting point being an element of system CS(U) such that the element either: (a) has at least two immediate children in CS(U) each of which comprises an element of R, or (b) consists of a single entity which is an element of R, wherein any element $e_1$ of CS(U) is called an immediate child of another element $e_2$ of CS(U) if $e_1$ is a proper subset of $e_2$ and there is no element $e_3$ in CS(U) which contains $e_1$ as a proper subset and which is a proper subset of $e_2$;

wherein operation (2A) comprises searching for at least two meeting points that are proper subsets of v and finding $x_1$ and $x_2$ as a result of the searching.

5. An apparatus adapted to perform the method of claim 4, the apparatus comprising a computer system comprising one or more computer processors and adapted to perform operation (2).

6. A computer-readable storage medium storing one or more computer instructions for a computer system to perform the method of claim 4.

7. A data transmission method comprising transmitting over a network a computer program for a computer system to perform the method of claim 4.

8. The method of claim 4 wherein at least one of $x_1$ and $x_2$ is not an immediate child of v.

9. The method of claim 4 wherein CS(U) contains no meeting points between $x_1$ and v and no meeting points between $x_2$ and v, wherein a CS(U) element $e_1$ is between CS(U) elements $e_2$ and $e_3$ if $e_1$ is a proper subset of one of $e_2$ or $e_3$, and the other one of $e_2$ or $e_3$ is a proper subset of $e_1$.

10. The method of claim 4 further comprising:
computing a set of all meeting points in CS(U), with the meeting points being ordered by their heights, wherein a meeting point's height represents a number of elements of CS(U) in a chain of elements beginning with the meeting point and ending with the chain's last element which is not a subset of any element of CS(U), with each element except the last element in the chain being an immediate child of the chain's next element;

selecting meeting points from the set of all meeting points in order of non-decreasing heights, and performing operations (2A)-2(C) for the selected meeting points.

11. The method of claim 1 wherein operations (2A)-(2C) are performed for multiple positive numbers $f_v$, the method further comprising selecting one of said numbers $f_v$ to provide an optimality cost for the cover CV(f,P).

12. The method of claim 1 wherein each piece of data comprises a cryptographic key or a value for generating a proof of validity or invalidity of digital data, and each message comprises an encryption with said cryptographic key or the proof of validity or invalidity.

13. An apparatus adapted to perform the method of claim 1, the apparatus comprising a computer system comprising one or more computer processors and adapted to perform operation (2).

14. A computer-readable storage medium storing one or more computer instructions for a computer system to perform the method of claim 1.

15. A data transmission method comprising transmitting over a network a computer program for a computer system to perform the method of claim 1.

16. A computer-implemented method for selecting data to form messages for transmission, the messages being associated with sets of entities, the method comprising:

(1) obtaining computer data representing:
 (1A) a set U of the entities;
 (1B) a target set P which is a subset of U;
 (1C) a set system CS(U), the set system being a set of subsets of U;

(2) determining a cover CV to cover at least the target set P, wherein the cover CV is to consist of zero or more sets S that are elements of the set system CS(U) such that a union of the sets S comprises the target set P, wherein the data to be selected are data pieces associated with the elements of the cover CV;

wherein determining the cover CV comprises:

(2a) computing an ordered set MP of all meeting points in CS(U), with the meeting points being ordered by their heights, a meeting point being an element of system CS(U) such that the element either: (a) has at least two immediate children in CS(U) each of which comprises an element of R=U\P, or (b) consists of a single entity which is an element of R, wherein any element $e_1$ of CS(U) is called an immediate child of another element $e_2$ of CS(U) if $e_1$ is a proper subset of $e_2$ and there is no element $e_3$ in CS(U) which contains $e_1$ as a proper subset and which is a proper subset of $e_2$, wherein a meeting point's height represents a number of elements of CS(U) in a chain of elements beginning with the meeting point and ending with the chain's last element which is not a subset of any element of CS(U), with each element except the last element in the chain being an immediate child of the chain's next element; and (2b) determining the cover CV from the meeting points;

(3) for each set of the cover CV, using the associated piece of data to generate a message, and transmitting the message.

17. The method of claim 16 wherein computing the set MP of all the meeting points comprises:
(2a-1) initializing the set MP to a sequence $u_1, u_2, \ldots, u_r$ of elements of CS(U) such that each element $u_i$ (i=1, 2, ..., r) consists of a respective single element of R, where r>1, wherein for each element $u_i$ in said sequence $u_1, u_2, \ldots, u_r$, either an element $a(u_i, u_{i+1})$ or an element $a(u_{i-1}, u_i)$ has a maximum height of all the elements $a(u_i, v)$ such that $v \in CS(U)$ is different from $u_i$ and consists of a single element of R, wherein for any two elements u, v of CS(U), a(u,v) denotes a CS(U) element having a maximum height of all elements containing both u and v;
(2a-2) defining a set E of pairs of elements of CS(U), and initializing the set E to a set of all the pairs of adjacent elements $\{u_i, u_{i+1}\}$, i=1, ..., r-1;
(2a-3) removing, from the set E, a pair $\{u_i, u_{i+1}\}$ for which the element $a(u_i, u_{i+1})$ has a maximum height of all pairs in E;
(2a-4) for the pair removed, appending the element $a(u_i, u_{i+1})$ to the set MP; and
(2a-5) if the set E still contains at least one pair comprising an element $u_i$ or $u_{i+1}$ of operation (2a-3), then replacing each such element $u_i$ or $u_{i+1}$ in each such at least one pair with the element $a(u_i, u_{i+1})$ of operation (2a-4).

18. The method of claim 17 wherein operations (2a-1) through (2a-5) are performed until the set E is empty.

19. An apparatus adapted to perform the method of claim 16, the apparatus comprising a computer system comprising one or more computer processors and adapted to perform operation (2).

20. A computer-readable storage medium storing one or more computer instructions for a computer system to perform the method of claim 16.

21. A data transmission method comprising transmitting over a network a computer program for a computer system to perform the method of claim 11.

* * * * *